(12) United States Patent
Chai et al.

(10) Patent No.: US 11,644,339 B2
(45) Date of Patent: May 9, 2023

(54) DATABASE CONSTRUCTION METHOD, POSITIONING METHOD, AND RELATED DEVICE

(71) Applicant: Huawei Technologies Co., Ltd., Shenzhen (CN)

(72) Inventors: Xun Chai, Shanghai (CN); Jun Wang, Shanghai (CN); Jingwei Zhou, Shanghai (CN); Jiong Deng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 286 days.

(21) Appl. No.: 17/126,908

(22) Filed: Dec. 18, 2020

(65) Prior Publication Data
US 2021/0103759 A1 Apr. 8, 2021

Related U.S. Application Data

(63) Continuation of application No. PCT/CN2019/082981, filed on Apr. 17, 2019.

(30) Foreign Application Priority Data

Jun. 20, 2018 (CN) .......................... 201810642562.4

(51) Int. Cl.
*G06V 10/46* (2022.01)
*G01C 21/00* (2006.01)
(Continued)

(52) U.S. Cl.
CPC ......... *G01C 21/3859* (2020.08); *G06F 16/51* (2019.01); *G06F 18/214* (2023.01);
(Continued)

(58) Field of Classification Search
CPC .......................... G01C 21/3859; G01C 21/30; G01C 21/3602; G01C 21/3848; G01C 21/165;
(Continued)

(56) References Cited

U.S. PATENT DOCUMENTS 9,940,729 B1 4/2018 Kwant et al.
10,838,601 B2 * 11/2020 Chen .................. G06F 3/04883
(Continued)

FOREIGN PATENT DOCUMENTS

CN 102707724 A 10/2012
CN 101998136 B 1/2013
(Continued)

OTHER PUBLICATIONS

Yongrong, Z., et al, "Method of Real Time Intersection Location Based on Monocular Vision for Intelligent Vehicle," Sep. 2017, 12 pages.

*Primary Examiner* — Aaron W Carter
(74) *Attorney, Agent, or Firm* — Conley Rose, P.C.

(57) ABSTRACT

A database construction method includes determining a target image set that meets a preset image coincidence degree requirement, obtaining a scenario key point information set based on the target image set and natural condition information corresponding to each image, determining, in the scenario key point information set, first scenario key point information corresponding to a scenario key point whose life value on a single mobile terminal is greater than a first preset life value threshold, determining, in the first scenario key point information, second scenario key point information corresponding to a scenario key point whose life value on a plurality of mobile terminals is greater than a second preset life value threshold, and when the second scenario key point information does not match preset scenario key point information in a database, constructing the (Continued)

database based on the second scenario key point information.

17 Claims, 15 Drawing Sheets

(51) Int. Cl.
| | |
|---|---|
| *G06F 16/51* | (2019.01) |
| *H04W 64/00* | (2009.01) |
| *H04L 67/52* | (2022.01) |
| *G06F 18/22* | (2023.01) |
| *G06F 18/214* | (2023.01) |
| *G06V 10/75* | (2022.01) |
| *G06V 10/74* | (2022.01) |
| *G06V 10/774* | (2022.01) |
| *G06V 20/56* | (2022.01) |

(52) U.S. Cl.
CPC ............ *G06F 18/22* (2023.01); *G06V 10/462* (2022.01); *G06V 10/757* (2022.01); *G06V 10/761* (2022.01); *G06V 10/774* (2022.01); *G06V 20/56* (2022.01); *H04L 67/52* (2022.05); *H04W 64/003* (2013.01)

(58) Field of Classification Search
CPC ........ G06F 16/51; G06F 18/214; G06F 18/22; G06V 10/462; G06V 10/757; G06V 10/761; G06V 10/774; G06V 20/56; H04L 67/52; H04W 64/003; H04W 64/00
See application file for complete search history.

(56) References Cited

U.S. PATENT DOCUMENTS

| | | | |
|---|---|---|---|
| 2018/0122136 | A1 | 5/2018 | Lynen et al. |
| 2018/0373933 | A1* | 12/2018 | Ghinamo ............ G06F 16/3328 |
| 2020/0167955 | A1* | 5/2020 | Bao ........................ G06T 7/248 |
| 2020/0302615 | A1* | 9/2020 | Lin ........................ G06V 20/20 |
| 2020/0353932 | A1* | 11/2020 | Wang .............. B60W 30/18159 |
| 2021/0103759 | A1* | 4/2021 | Chai .................... G01C 21/3602 |
| 2021/0254989 | A1* | 8/2021 | Lee ........................ G06T 7/254 |
| 2022/0101654 | A1* | 3/2022 | Zhang .................... G06N 3/044 |
| 2022/0156968 | A1* | 5/2022 | Du ........................ G06V 20/64 |
| 2022/0156969 | A1* | 5/2022 | Ding ....................... G06V 10/44 |
| 2022/0319046 | A1* | 10/2022 | Bao ...................... G06V 10/761 |

FOREIGN PATENT DOCUMENTS

| | | |
|---|---|---|
| CN | 104715479 A | 6/2015 |
| CN | 106256644 A | 12/2016 |
| CN | 106447585 A | 2/2017 |
| CN | 106851231 A | 6/2017 |
| CN | 106931963 A | 7/2017 |
| CN | 106295512 B | 8/2019 |
| EP | 2372607 A2 | 10/2011 |
| EP | 3018448 A1 | 5/2016 |

* cited by examiner

| Database | | |
|---|---|---|
| Key point 1 | Key point 2 | Key point 3 |
| Descriptor 1 / Descriptor 2 / Descriptor 3 | Descriptor 4 / Descriptor 5 / Descriptor 6 | Descriptor 7 / Descriptor 8 / Descriptor 9 |
| 3D coordinates 1 | 3D coordinates 2 | 3D coordinates 3 |
| Pixel coordinates 1 | Pixel coordinates 2 | Pixel coordinates 3 |

| Image | | |
|---|---|---|
| Key point 1 | Key point 2 | Key point 4 |
| Descriptor 1 | Descriptor 4 | Descriptor 10 |
| Pixel coordinates 1 | Pixel coordinates 2 | Pixel coordinates 4 |

FIG. 12A

| Database | | | | | | | | |
|---|---|---|---|---|---|---|---|---|
| Key point 1 | | | Key point 2 | | | Key point 3 | | |
| Descriptor 1 | Descriptor 2 | Descriptor 3 | Descriptor 4 | Descriptor 5 | Descriptor 6 | Descriptor 7 | Descriptor 8 | |
| 3D coordinates 1 | | | 3D coordinates 2 | | | 3D coordinates 3 | | |
| Pixel coordinates 1 | | | Pixel coordinates 2 | | | Pixel coordinates 3 | | |

| Image | | |
|---|---|---|
| Key point 1 | Key point 2 | Key point 3 |
| Descriptor 1 | Descriptor 4 | Descriptor 9 |
| Pixel coordinates 1 | Pixel coordinates 2 | Pixel coordinates 3 |

FIG. 12B

| Image | 3D coordinates of a location of the mobile device during image photographing relative to a world coordinate system | Posture of the mobile device during image photographing |
|---|---|---|
|  | (X1, Y1, Z1) | Front-left 15 degrees |
|  | (X2, Y2, Z2) | Front-left 30 degrees |
|  | (X3, Y3, Z3) | Front-left 45 degrees |
FIG. 17

DATABASE CONSTRUCTION METHOD, POSITIONING METHOD, AND RELATED DEVICE

CROSS-REFERENCE TO RELATED APPLICATIONS

This application is a continuation of International Patent Application No. PCT/CN2019/082981 filed on Apr. 17, 2019, which claims priority to Chinese Patent Application No. 201810642562.4 filed on Jun. 20, 2018, both of which are hereby incorporated by reference in their entireties.

TECHNICAL FIELD

This application relates to the field of communications, and in particular, to a data construction method, a positioning method, and a related device.

BACKGROUND

In an unmanned driving technology, vehicle positioning is important. During running of a vehicle, a latest location of the vehicle needs to be obtained in real time, and a subsequent route of the vehicle needs to be planned. Generally, positioning may be performed by using a Global Positioning System (GPS), a camera, a laser radar, a millimeter-wave radar, and/or an inertial measurement unit (IMU). However, positioning precision is inevitably inaccurate in these positioning manners.

Currently, a visual positioning method is proposed. Based on a principle of the method, a database is established, and a key point of a real-time scenario and a key point of a same scenario in the database are identified and matched to implement positioning. The database stores a scenario key frame and a scenario key point. The key frame is used to represent an image in a real world. The scenario key point is a visual scenario key point extracted from the scenario key frame, and the scenario key point belongs to the key frame. The scenario key point further has a descriptor that is used to describe the scenario key point. In addition, the scenario key point has different descriptor information for different natural conditions.

When an external environment changes, collected descriptor information in a real scenario key frame also changes, causing a change in a corresponding scenario key point. When scenario key point matching is performed in a visual positioning process, some scenario key points in the real scenario key frame may not match scenario key points in the database, finally resulting in inaccurate positioning.

SUMMARY

Embodiments of this application disclose a database construction method, a positioning method, and a related device, to construct a database based on second scenario key point information corresponding to target natural condition information, to ensure more accurate positioning when the database is used for positioning.

A first aspect of this application provides a database construction method.

After obtaining an image set, a network device determines, from the image set, a target image set that meets a preset coincidence degree requirement. When a mobile device goes straight, the image set is obtained based on a preset distance spacing, and then whether a coincidence degree of images obtained based on the preset distance spacing meets a requirement is calculated. When a vehicle turns, the image set is obtained based on a preset angle spacing, and then whether a coincidence degree of images obtained based on the preset angle spacing meets a requirement is calculated.

In this embodiment, the image is an image of the mobile device and a surrounding environment of the mobile device. The image may be obtained by a camera installed on the mobile device, or may be obtained by using an image obtaining function of the mobile device. This is not specifically limited herein.

In this embodiment, the target image set includes at least one image, and each image is photographed in a unique natural condition. Therefore, each image corresponds to one type of natural condition information.

A manner of determining the natural condition information is as follows. The mobile device obtains location information of the mobile device by using a GPS, a laser radar, a millimeter-wave radar, and/or an IMU, and then sends the location information to a climate server to obtain natural condition information of a current location.

The network device analyzes and processes the target image set to obtain scenario key point information. Each image in the target image set corresponds to the unique one type of natural condition information. The network device establishes a correspondence between each scenario key point in a scenario key point set and natural condition information, to obtain a scenario key point information set. The scenario key point information set includes at least one piece of scenario key point information. Each piece of scenario key point information includes three-dimensional (3D) coordinates, pixel coordinates, a key frame identifier (ID), and descriptor information of a scenario key point. Each piece of descriptor information includes one type of natural condition information. The 3D coordinates, pixel coordinates, and key frame ID of the scenario key point are static indexes, and the descriptor information is a dynamic index and varies with a natural condition.

A visual positioning process is a process in which scenario key points are compared to determine a same scenario key point and positioning is performed based on the same scenario key point. A static scenario key point is usually used as a scenario key point for comparison, and this makes positioning more accurate. To find a representative static scenario key point in the scenario key point set, a life value needs to be calculated. A life value is used to indicate a probability that a scenario key point is a static scenario key point. A larger life value indicates a higher probability that the scenario key point is the static key point, and vice versa.

A same scenario key point may be photographed by a single mobile device, or may be photographed by a plurality of mobile devices. First, a scenario key point whose life value is greater than a first preset life value threshold for the single mobile device, in other words, when the scenario key point is observed by one mobile device, is determined in the scenario key point information set. Then, a scenario key point whose life value is greater than a second preset life value threshold for the plurality of mobile devices, in other words, when the scenario key point is observed by two or more mobile devices, is determined in first scenario key point information. The scenario key point is a second scenario key point.

Second scenario key point information obtained through screening in the foregoing manner is compared with preset scenario key point information in a database. When the second scenario key point information does not match the preset scenario key point information in the database, the second scenario key point information is updated in the database. In this way, the scenario key point information in the database is more complete.

This embodiment has the following advantages. After the target image set that meets the preset image coincidence degree requirement is determined, the scenario key point information set is determined based on the target image set and the natural condition information corresponding to each image in the image set. After that, the second scenario key point information corresponding to the scenario key point whose life value on the single mobile device is greater than the first preset life value threshold and whose life value on the plurality of mobile devices is greater than the second preset life value threshold is determined in the scenario key point information set. When the second scenario key point information does not match the preset scenario key point information in the database, the database is constructed based on the second scenario key point information. In this embodiment, after the second scenario key point information is obtained through screening in the foregoing manner, when second scenario key point information related to a type of natural condition information does not exist in the database, the database is constructed based on the second scenario key point information. This ensures more accurate positioning when the constructed database is used for positioning.

According to the first aspect, in a first implementation of the first aspect, specifically, that the second scenario key point information does not match the preset scenario key point information in the database includes the second scenario key point information does not exist in the database.

When the second scenario key point does not exist in the database, apparently, the second scenario key point information cannot exist in the database either. In this case, the second scenario key point information is stored in the database. The stored second scenario key point information includes 3D coordinates, pixel coordinates, a key frame ID, and descriptor information of the second scenario key point.

In this embodiment, a case in which the database is constructed based on the second scenario key point information is described. This improves solution implementability.

According to the first aspect, in a second implementation of the first aspect, specifically, that the second scenario key point information does not match the preset scenario key point information in the database includes the second scenario key point information exists in the database, but the second scenario key point information does not include target descriptor information about target natural condition information.

The second scenario key point information exists in the database. However, the stored second scenario key point information in the database is different from second scenario key point information determined from an image because dynamic indexes, namely, descriptor information, of the two pieces of second scenario key point information change. For example, the second scenario key point information in the database is information about 3D coordinates, pixel coordinates, a key frame ID, and a descriptor 1 of the second scenario key point. The second scenario key point information determined from the image is information about the 3D coordinates, the pixel coordinates, the key frame ID, and a descriptor 2 of the second scenario key point.

In this case, the target descriptor information related to the target natural condition information, in other words, the information about the descriptor 2, needs to be added to the second scenario key point in the database.

In this embodiment, another case in which the database is constructed based on the second scenario key point information is described. This improves solution implementation flexibility.

According to the first or the second implementation of the first aspect, in a third implementation of the first aspect, before the adding the second scenario key point information to the database, the method further includes determining the 3D coordinates of the second scenario key point in the second scenario key point information, where the 3D coordinates are synchronously determined when positioning information of the image to which the second scenario key point belongs is determined, and calculating a difference between 3D coordinates of each preset scenario key point in the database and the 3D coordinates of the second scenario key point, and determining whether the difference is greater than a first preset threshold, and if the difference is greater than the first preset threshold, determining that the second scenario key point information does not exist in the database, or if a difference between 3D coordinates of any one preset scenario key point in the database and the 3D coordinates of the second scenario key point is less than a first preset threshold, determining that both the second scenario key point and the second scenario key point information exist in the database.

In this embodiment, a manner of determining whether the second scenario key point exists in the database is described. This improves solution implementability.

According to the second implementation of the first aspect, in a fourth implementation of the first aspect, before the adding the target descriptor information to the preset second scenario key point information in the database, the method further includes, when the second scenario key point information exists in the database, determining at least one descriptor of the preset second scenario key point information in the database, and determining whether the at least one descriptor includes a descriptor, where a distance between the descriptor and a descriptor corresponding to the target descriptor information in the image is less than a preset distance threshold, and if a distance between each preset descriptor in the database and the descriptor corresponding to the target descriptor information in the second scenario key point information is greater than a second preset distance threshold, determining that the preset second scenario key point information in the database does not include the target descriptor information.

In this embodiment, a manner of determining whether the target descriptor information exists in the database is described. This improves solution implementability.

According to the first aspect and the first and the second implementations of the first aspect, in a fifth implementation of the first aspect, the life value of the scenario key point on the single mobile device is f, and a calculation formula of f is $$f = \frac{1}{\sigma\sqrt{2n}} e^{-\frac{1}{2}\left(\frac{n-n_0}{\sigma}\right)^2}.$$

In the foregoing formula, n represents a quantity of times that a scenario key point is observed on the single mobile device, and the single mobile device may perform a plurality of experiments to obtain an image. Therefore, a scenario key point may be observed by the single mobile device for a plurality of times. $n_0$ is an average value that is of a quantity of times that any scenario key point is observed by at least one mobile device and that is obtained in advance through model training, and σ is a variance that is of the quantity of times that the any scenario key point is observed by the at least one mobile device and that is obtained in advance through model training.

In this embodiment, the calculation formula of the life value of the scenario key point on the single mobile device is described. This improves solution implementability.

According to the fifth implementation of the first aspect, in a sixth implementation of the first aspect, a scenario key point may be photographed by the plurality of mobile devices, a life value of the scenario key point on the plurality of mobile devices is F, and a calculation formula of F is $$F = \sum_{i=1}^{n} \beta_i f_i,$$

where f is a life value of the scenario key point on the single mobile device, B is a weight coefficient corresponding to each of the plurality of mobile devices, and one of the plurality of mobile devices corresponds to one weight coefficient. For example, a scenario key point is photographed by three mobile devices, and each of the three mobile devices corresponds to a weight coefficient. In this case, a life value of the scenario key point on a single mobile device is multiplied by a weight coefficient of the mobile device. Then, a summation operation is performed on the three mobile devices to obtain a life value of the scenario key point when the scenario key point is observed by the plurality of mobile devices.

In this embodiment, the plurality of mobile devices represent at least two mobile devices.

In this embodiment, the calculation formula of the life value of the scenario key point on the plurality of mobile devices is described. This improves solution implementability.

According to the sixth implementation of the first aspect, in a seventh implementation of the first aspect, a calculation formula of $\beta_i$ is $\beta_i = \gamma_t + \gamma_g + \gamma_c$, where $\gamma_t$ is a time continuity index of the scenario key point observed on the plurality of mobile devices, $\gamma_g$ is a geometric continuity index of the scenario key point observed on the plurality of mobile devices, and $\gamma_c$ is a description consistency index of the scenario key point observed on the plurality of mobile devices.

$\gamma_t$ is related to a time interval for a same scenario key point observed by different mobile devices, the geometric continuity index $\gamma_g$ is related to a Euclidean distance for the same scenario key point observed by the different mobile devices, and the description consistency index $\gamma_c$ is related to a descriptor distance for the same scenario key point observed by the different mobile devices.

In this embodiment, the calculation formula of the weight coefficient $\beta_i$ is described. This improves solution implementability.

According to the first aspect and the first and the second implementations of the first aspect, in an eighth implementation of the first aspect, the determining a target image set that meets a preset image coincidence degree requirement includes the following.

When the mobile device goes straight, image selection is first performed based on the preset distance spacing $d_{k+1}$. When a difference between a coincidence degree of selected images and a preset coincidence degree threshold is within a preset precision range, the selected images are determined as target images, and then image selection is performed based on the preset distance spacing to obtain the target image set.

When a difference between a coincidence degree of selected images and a preset coincidence degree threshold is not within a preset precision range, a distance spacing to be increased or decreased based on the distance spacing $d_{k+1}$ is obtained through calculation based on a difference between an image coincidence degree corresponding to the distance spacing $d_{k+1}$ and the preset coincidence degree threshold, to ensure that a selected image meets the preset coincidence degree requirement, to obtain a distance spacing $d_{k+2}$ for image selection next time. Then, $d_{k+2}$ is used as the distance spacing for image selection, and the foregoing step is performed again. If an image selected based on $d_{k+2}$ meets the coincidence degree requirement, the target image set is obtained through image selection based on $d_{k+2}$.

In this embodiment, the image meeting the coincidence degree requirement is selected. This can avoid an excessively large data amount during image processing due to blind image selection, and also can avoid an excessively large data amount during matching of existing scenario key point information in the database.

According to the eighth implementation of the first aspect, in a ninth implementation of the first aspect, the preset distance spacing is $d_{k+1}$.

A calculation formula of the preset distance spacing is $d_{k+1} = d_k + d_k(\alpha^* - \alpha)$, where $\alpha^*$ is the preset coincidence degree threshold, $d_k$ is a distance spacing for image selection at a previous moment, and is a coincidence degree, obtained through calculation, of images when the images are selected based on the distance spacing $d_k$.

In this embodiment, the calculation formula of the preset distance spacing is described. This improves solution integrity.

According to the first aspect and the first and the second implementations of the first aspect, in a tenth implementation of the first aspect, the determining a target image set that meets a preset image coincidence degree requirement includes the following.

When the mobile device turns, image selection is first performed based on the preset angle spacing $\theta_{k+1}$. When a difference between a coincidence degree of selected images and a preset coincidence degree threshold is within a preset precision range, the selected images are determined as target images, and then image selection is performed again based on the preset angle spacing to obtain the target image set.

When a difference between a coincidence degree of selected images and a preset coincidence degree threshold is not within a preset precision range, an angle spacing to be increased or decreased based on the angle spacing $\theta_{k+1}$ is obtained through calculation based on a difference between an image coincidence degree corresponding to the angle spacing $\theta_{k+1}$ and the preset coincidence degree threshold, to ensure that a selected image meets the preset coincidence degree requirement, to obtain an angle spacing $\theta_{k+2}$ for image selection next time. Then, $\theta_{k+2}$ is used as the angle spacing for image selection, and the foregoing step is performed again. If an image selected based on $\theta_{k+2}$ meets the coincidence degree requirement, the target image set is obtained through image selection based on $\theta_{k+2}$.

In this embodiment, the image meeting the coincidence degree requirement is selected. This can avoid an excessively large data amount during image processing due to blind image selection, and also can avoid an excessively large data amount during matching of existing scenario key point information in the database.

According to the tenth implementation of the first aspect, in an eleventh implementation of the first aspect, the preset angle spacing is $\theta_{k+1}$.

A calculation formula of the preset angle spacing is $\theta_{k+1} = \theta_k \; \theta_k(\alpha^* - \alpha)$, where $\alpha^*$ is the preset coincidence degree threshold, $\theta_k$ is an angle spacing for image selection at a previous moment, and c is a coincidence degree, obtained through calculation, of images when the images are selected based on the angle spacing $\theta_k$.

In this embodiment, the calculation formula of the preset angle spacing is described. This improves solution integrity.

According to the first aspect and the first and the second implementations of the first aspect, in a twelfth implementation of the first aspect, the scenario key point information includes descriptor information corresponding to the natural condition information, and the obtaining a scenario key point information set based on the target image set and the natural condition information includes (1) processing, by the network device, one target image to obtain a scenario key point of the target image, and (2) establishing a correspondence between the scenario key point, the target image (or a key frame ID of the scenario key point) to which the scenario key point belongs, and the natural condition information corresponding to the target image, to constitute the scenario key point information, where the scenario key point information further includes 3D coordinates, pixel coordinates, and the like of the scenario key point.

The scenario key point may belong to a plurality of target images, in other words, each of the plurality of target images includes the scenario key point. Each target image usually corresponds to different natural condition information. Therefore, the scenario key point information may include a plurality of pieces of descriptor information. It is possible that two or more target images correspond to same natural condition information.

The steps (1) and (2) are performed again to complete the foregoing processing on each image, until the scenario key point information set is constituted.

In this embodiment, a manner of determining the scenario key point information set is described. This improves solution integrity.

According to the first aspect and the first and the second implementations of the first aspect, in a thirteenth implementation of the first aspect, after the constructing the database based on the second scenario key point information, the method further includes determining scenario key point information in the constructed database, where the scenario key point information is third scenario key point information, and when a feature number controlling score (FNCS) of a third scenario key point corresponding to the third scenario key point information is less than a preset FNCS threshold, deleting the third scenario key point information from the database, where a value of the FNCS may represent a probability that a scenario key point is used during positioning and a quantity of descriptors included in scenario key point information.

In this embodiment, the preset FNCS may be determined in advance based on a plurality of experiments.

In this embodiment, scenario key point management after the database is constructed is described. A scenario key point with a low FNCS value may be deleted, to facilitate database management.

According to the thirteenth implementation of the first aspect, in a fourteenth implementation of the first aspect, a calculation formula of the FNCS is $$FNCS = \frac{m_i}{M} \log \frac{N}{n_i}, \text{ where } \frac{m_i}{M}$$

is the probability that the scenario key point is used during positioning, M is a total quantity of times that positioning is performed on a location of the scenario key point, $m_i$ represents a quantity of times that the scenario key point is used during positioning, and $$\frac{N}{n_i}$$

is a percentage of a quantity of descriptors of the scenario key point in a total quantity of descriptors in an image to which the scenario key point belongs.

In this embodiment, the calculation formula of the FNCS is described. This improves solution implementability.

A second aspect of the embodiments of this application provides a positioning method, including the following steps.

A network device obtains a real-time image of a mobile device. In this embodiment, the real-time image is an image of the mobile device and a surrounding environment of the mobile device. The real-time image may be obtained by a camera installed on the mobile device, or may be obtained by using an image obtaining function of the mobile device. This is not specifically limited herein.

After obtaining the real-time image, the network device analyzes and processes the real-time image to determine at least one piece of first descriptor information. The first descriptor information includes target natural condition information of a location of the mobile device when the mobile device or an external camera of the mobile device photographs the real-time image. The real-time image includes at least one piece of key point information. Natural condition information when the real-time image is photographed is fixed. Therefore, one piece of key point information includes only one piece of descriptor information. Further, at least one piece of descriptor information of the real-time image includes same target natural condition information.

The target natural condition information may be determined by the network device, or may be determined by the mobile device and then sent to the network device. A manner of determining the target natural condition information is as follows. The network device or the mobile device may first determine, by using a GPS, a laser radar, a millimeter-wave radar, and/or an IMU, location information of the mobile device when the real-time image is photographed, and then the network device or the mobile device determines the target natural condition information based on the location information.

Preset descriptor information in a database is compared with the at least one piece of first descriptor information to determine same descriptor information. A specific comparison manner is determining one piece of descriptor information in the at least one piece of descriptor information, determining whether a distance between a descriptor corresponding to the one piece of descriptor information and a descriptor corresponding to any one piece of preset descriptor information in the database is less than a preset distance threshold, and if the distance between the descriptor corresponding to the one piece of descriptor information and the descriptor corresponding to the any one piece of preset descriptor information in the database is less than the preset distance threshold, determining that the descriptor and the descriptor with the distance spacing away from the descriptor less than the preset distance threshold in the database are a same descriptor, where corresponding descriptor information is also the same, or if the distance between the descriptor corresponding to the one piece of descriptor information and the descriptor corresponding to the any one piece of preset descriptor information in the database is not less than the preset distance threshold, determining that the two descriptors are different, where corresponding descriptor information is also different.

The foregoing steps are performed again. Each descriptor in the at least one piece of descriptor information is compared with a preset descriptor in the database to obtain the same descriptor information through determining.

In this embodiment, the preset descriptor information in the database is obtained after the database is constructed. After determining a target image set that meets a preset image coincidence degree requirement, the network device obtains a scenario key point information set based on the target image set and natural condition information corresponding to each image in the target image set, selects, from the scenario key point information set, first scenario key point information corresponding to a first scenario key point that meets a preset life value requirement, determines second descriptor information that is in the first scenario key point information and that corresponds to the target natural condition information, and constructs the database based on the second descriptor information when the second descriptor information does not match the preset descriptor information in the database.

In this embodiment, a specific process for constructing the database is similar to the process for constructing the database in the first aspect of this application. Details are not described herein again.

After the same descriptor information is obtained, the real-time image is visually positioned based on the same descriptor information.

In this embodiment, a positioning process after the database is constructed is described. This improves solution practicability.

According to the second aspect, in a first implementation of the second aspect, the positioning the real-time image by using the same descriptor information includes, after determining the same descriptor information in the real-time image and the database, determining first scenario key point information to which the same descriptor information belongs in the database, searching the database to obtain information such as 3D coordinates and pixel coordinates of a first scenario key point, and obtaining, based on the first scenario key point information and a positioning calculation formula, a location of a target mobile device when the real-time image is photographed.

In this embodiment, a specific manner of positioning the real-time image is described. This improves solution implementability.

According to the first implementation of the second aspect, in a second implementation of the second aspect, the positioning calculation formula of the location of the target mobile device when the real-time image is photographed is:

$$r(T_V^G) = \sum_{i=1}^{n} \|\pi_C(T_D^G)^{-1} T_V^G (\pi_C)^{-1} p_i^C - p_i^D\|^2,$$

where $p_i^C$ is pixel coordinates of the first scenario key point in the real-time image, $\pi_C$ is an intrinsic parameter matrix of a camera, $\pi_C$ is used to convert 3D coordinates into pixel coordinates, $T_D^G$ is a pose of an image to which a scenario key point $p_i^D$ in the database belongs relative to a world coordinate system, $p_i^D$ is pixel coordinates of the first scenario key point in the database, a value of i ranges from 1 to n, n is a positive integer, and the first scenario key point corresponds to the first scenario key point information.

There are a total of n scenario key points in the real-time image that match scenario key points in the database. 3D coordinates relative to the vehicle are obtained by performing $(\pi_C)^{-1}$ conversion on and then 3D coordinates relative to the world coordinate system are obtained by performing $T_V^G$ conversion on the obtained 3D coordinates relative to the vehicle. Then, pixel coordinates relative to the database are obtained by performing $\pi_C(T_D^G)^{-1}$ conversion on the obtained 3D coordinates relative to the world coordinate system. $T_D^G$ is a pose of a key frame to which the scenario key point $p_i^D$ in the database belongs relative to the world coordinate system. The pixel coordinates obtained through conversion are consistent with pixel coordinates $p_i^D$ of a matched scenario key point in the database, and the pixel coordinates are subtracted to obtain a reprojection error model. Finally, a real-time pose $T_V^G$ of the vehicle can be obtained by minimizing a value of the reprojection error model by using an optimization method.

In this embodiment, a specific algorithm of the positioning formula is described. This improves solution integrity.

According to the second aspect and the first and the second implementations of the second aspect, in a third implementation of the second aspect, after the determining at least one piece of first descriptor information based on the real-time image, the method further includes comparing the preset descriptor information in the database with the at least one piece of first descriptor information to determine different descriptor information.

In this embodiment, a manner of comparing the descriptor information is similar to the foregoing manner of comparing the descriptor information in the second aspect. Details are not described herein again.

If descriptor information different from that in the database exists in the real-time image, descriptor information of a different descriptor is added to the database. This ensures more accurate positioning when the database is used for positioning.

In this embodiment, the database can be updated based on the different descriptor information in a positioning process. This makes the database more complete, and ensures more accurate positioning.

According to the third implementation of the second aspect, in a fourth implementation of the second aspect, when second scenario key point information to which the different descriptor information belongs does not exist in the database, the constructing the database based on the different descriptor information includes the following.

When a second scenario key point does not exist in the database, the second scenario key point information does not exist correspondingly. The second scenario key point is a scenario key point to which the different descriptor belongs. In this case, the second scenario key point information including the different descriptor information needs to be added to the database. In this embodiment, there may be a plurality of pieces of different descriptor information, and one piece of second scenario key point information of the real-time image can include only one different descriptor.

Therefore, a plurality of pieces of second scenario key point information need to be added to the database.

In this embodiment, a case in which the database is constructed based on the different descriptor information is described. This improves solution practicality.

According to the third implementation of the second aspect, in a fifth implementation of the second aspect, when second scenario key point information to which the different descriptor information belongs exists in the database, the constructing the database based on the different descriptor information includes the following.

When a second scenario key point exists in the database, the second scenario key point information also exists in the database. However, the second scenario key point information in the database is different from that in the real-time image, in other words, the second scenario key point information does not include the different descriptor information. In this case, the different descriptor information needs to be added to the second scenario key point information in the database. For example, the second scenario key point information in the database is information about 3D coordinates, pixel coordinates, a key frame ID, and a descriptor 1 of the second scenario key point. The second scenario key point information determined in the real-time image is information about the 3D coordinates, the pixel coordinates, the key frame ID, and a descriptor 2 of the second scenario key point. In this case, the information about the descriptor 2 needs to be added to the second scenario key point information in the database.

In this embodiment, another case in which the database is constructed based on the different descriptor information is described. This improves solution integrity.

According to third implementation of the second aspect, in a sixth implementation of the second aspect, before the constructing the database based on the different descriptor information, the method further includes determining 3D coordinates of a second scenario key point included in second scenario key point information, where the 3D coordinates are synchronously determined when positioning information of the image to which the second scenario key point belongs is determined, and calculating a difference between 3D coordinates of each preset scenario key point in the database and the 3D coordinates of the second scenario key point, and determining whether the difference is greater than a first preset threshold, and if the difference is greater than the first preset threshold, determining that the second scenario key point information does not exist in the database, or if a difference between 3D coordinates of any one preset scenario key point in the database and the 3D coordinates of the second scenario key point is less than a first preset threshold, determining that both the second scenario key point and the second scenario key point information exist in the database.

In this embodiment, a manner of determining whether the second scenario key point exists in the database is described. This improves solution implementability.

A third aspect of this application provides a database. The database is deployed on a server.

The database is constructed by using second scenario key point information that does not match preset scenario key point information in the database. The second scenario key point information is scenario key point information that is in first scenario key point information and that corresponds to a scenario key point whose life value on a plurality of mobile devices is greater than a second preset life value threshold. The first scenario key point information is scenario key point information that is in a scenario key point information set and that corresponds to a scenario key point whose life value on a single mobile device is greater than a first preset life value threshold. The scenario key point information set is obtained based on a target image set and natural condition information corresponding to each image. The scenario key point set includes at least one piece of scenario key point information. The target image set includes at least one image that meets a preset image coincidence degree requirement, and each image corresponds to one type of natural condition information.

In this embodiment, a process for constructing the database is similar to the process for constructing the database in the first aspect. Details are not described herein again.

In this embodiment, a manner of constructing the database is described. The constructed database can be used for visual positioning, to achieve more accurate positioning.

According to the third aspect, in a first implementation of the third aspect, the server further includes a processor.

That second scenario key point information does not match preset scenario key point information in the database includes the second scenario key point information does not exist in the database.

That the database is constructed by using second scenario key point information includes, when the second scenario key point information does not exist in the database, the second scenario key point information is added to the database, where in this way, the database is constructed by the server by adding the second scenario key point information to the database, and the second scenario key point information includes target descriptor information about target natural condition information.

In this embodiment, a manner of constructing the database based on a second scenario key point is described. This improves solution implementability.

According to the third aspect, in a second implementation of the third aspect, the server further includes a processor.

That second scenario key point information does not match preset scenario key point information in the database includes the second scenario key point information exists in the database, and the second scenario key point information does not include target descriptor information about target natural condition information.

That the database is constructed by using second scenario key point information includes, when the preset scenario key point information in the database is the same as the second scenario key point information, but the preset scenario key point information in the database and the second scenario key point information have different descriptor information, the different descriptor information is added to the database, and therefore the database is constructed by the server by adding the target descriptor information to the preset second scenario key point information in the database.

In this embodiment, another manner of constructing the database based on a second scenario key point is described. This improves solution implementation diversity.

A fourth aspect of this application provides a network device, including a determining unit, a processing unit, and a database construction unit.

The determining unit is configured to determine a target image set that meets a preset image coincidence degree requirement, where the target image set includes at least one image, and each image corresponds to one type of natural condition information.

The processing unit is configured to obtain a scenario key point information set based on the target image set and the natural condition information corresponding to each image, where the scenario key point set includes at least one piece of scenario key point information.

The determining unit is further configured to determine, in the scenario key point information set, first scenario key point information corresponding to a scenario key point whose life value on a single mobile device is greater than a first preset life value threshold, where the life value is used to represent a probability that the scenario key point is a static scenario key point.

The determining unit is further configured to determine, in the first scenario key point information, second scenario key point information corresponding to a scenario key point whose life value on a plurality of mobile devices is greater than a second preset life value threshold.

The database construction unit is configured to, when the second scenario key point information does not match preset scenario key point information in a database, construct the database based on the second scenario key point information.

In this embodiment, after the second scenario key point information is obtained through screening in the foregoing manner, when second scenario key point information related to a type of natural condition information does not exist in the database, the database is constructed based on the second scenario key point information. This ensures more accurate positioning when the constructed database is used for positioning.

According to the fourth aspect, in a first implementation of the fourth aspect, that the second scenario key point information does not match preset scenario key point information in a database includes the second scenario key point information does not exist in the database, and the database construction unit is specifically configured to add the second scenario key point information to the database, where the second scenario key point information includes target descriptor information about target natural condition information.

In this embodiment, a case in which the database is constructed based on the second scenario key point information is described. This improves solution implementability.

According to the fourth aspect, in a second implementation of the fourth aspect, that the second scenario key point information does not match preset scenario key point information in a database includes the second scenario key point information exists in the database, and the second scenario key point information does not include target descriptor information about target natural condition information, and the database construction unit is specifically configured to add the target descriptor information to the preset second scenario key point information in the database.

In this embodiment, another case in which the database is constructed based on the second scenario key point information is described. This improves solution implementation flexibility.

According to the first or the second implementation of the fourth aspect, in a third implementation of the fourth aspect, the determining unit is further configured to determine 3D coordinates of the second scenario key point corresponding to the second scenario key point information, and when a difference between 3D coordinates of each preset scenario key point in the database and the 3D coordinates of the second scenario key point is greater than a first preset threshold, determine that the second scenario key point information does not exist in the database, or when a difference between 3D coordinates of any one preset scenario key point in the database and the 3D coordinates of the second scenario key point is less than a first preset threshold, determine that the second scenario key point information exists in the database.

In this embodiment, a manner of determining whether the second scenario key point exists in the database is described. This improves solution implementability.

According to the second implementation of the fourth aspect, in a fourth implementation of the fourth aspect, the determining unit is further configured to determine at least one piece of descriptor information of the preset second scenario key point in the database.

The network device further includes a judging unit, configured to determine whether the at least one piece of descriptor information includes one piece of descriptor information, where a distance between a descriptor corresponding to the one piece of descriptor information and a descriptor corresponding to the target descriptor information is less than a preset distance threshold.

The determining unit is further configured to, if the at least one piece of descriptor information does not include the one piece of descriptor information, where the distance between the descriptor corresponding to the one piece of descriptor information and the descriptor corresponding to the target descriptor information is less than the preset distance threshold, determine that the preset second scenario key point information in the database does not include the target descriptor information.

In this embodiment, a manner of determining whether the target descriptor information exists in the database is described. This improves solution implementability.

According to the fourth aspect and the first and the second implementations of the fourth aspect, in a fifth implementation of the fourth aspect, the life value of the scenario key point on the single mobile device is f, and a calculation formula of f is $$f = \frac{1}{\sigma\sqrt{2n}} e^{-\frac{1}{2}\left(\frac{n-n_0}{\sigma}\right)^2},$$

where n indicates a quantity of times that the scenario key point is observed on the single mobile device, $n_o$ is a preset average value of a quantity of times that a scenario key point is observed, and $\sigma$ is a preset variance of the quantity of times that the scenario key point is observed.

In this embodiment, the calculation formula of the life value of the scenario key point on the single mobile device is described. This improves solution implementability.

According to the fifth implementation of the fourth aspect, in a sixth implementation of the fourth aspect, the life value of the scenario key point on the plurality of mobile devices is F, and a calculation formula of F is $$F = \sum_{i=1}^{n} \beta_i f_i,$$

where f is the life value of the scenario key point on the single mobile device, B is a weight coefficient corresponding to each mobile device, and one of the plurality of mobile devices corresponds to one weight coefficient.

In this embodiment, the calculation formula of the life value of the scenario key point on the plurality of mobile devices is described. This improves solution implementability.

According to the sixth implementation of the fourth aspect, in a seventh implementation of the fourth aspect, a calculation formula of $\beta_i$ is $=\gamma_t+\gamma_g+\gamma_c$, where $\gamma_t$ is a time continuity index of the scenario key point observed on the plurality of mobile devices, $\gamma_g$ is a geometric continuity index of the scenario key point observed on the plurality of mobile devices, and $\gamma_c$ is a description consistency index of the scenario key point observed on the plurality of mobile devices.

In this embodiment, the calculation formula of the weight coefficient $\beta_i$ is described. This improves solution implementability.

According to the fourth aspect and the first and the second implementations of the fourth aspect, in an eighth implementation of the fourth aspect, the determining unit is specifically configured to select an image based on a preset distance spacing, and when a difference between a coincidence degree of selected images and a preset coincidence degree threshold is within a preset precision range, determine that the selected images belong to the target image set.

In this embodiment, the image meeting the coincidence degree requirement is selected. This can avoid an excessively large data amount during image processing due to blind image selection, and also can avoid an excessively large data amount during subsequent matching of existing scenario key point information in the database.

According to the eighth implementation of the fourth aspect, in a ninth implementation of the fourth aspect, the preset distance spacing is $d_{k+1}$.

A calculation formula of the preset distance spacing is $d_{k+1}=d_k+d_k(\alpha^*-a)$, where $\alpha^*$ is the preset coincidence degree threshold, $d_k$ is a distance spacing for image selection at a previous moment, and $\alpha$ is a coincidence degree of images when the images are selected based on the distance spacing $d_k$.

In this embodiment, the calculation formula of the preset distance spacing is described. This improves solution integrity.

According to the fourth aspect and the first and the second implementations of the fourth aspect, in a tenth implementation of the fourth aspect, the determining unit is specifically configured to select an image based on a preset angle spacing, and when a difference between a coincidence degree of selected images and a preset coincidence degree threshold is within a preset precision range, determine that the selected images belong to the target image set.

In this embodiment, the image meeting the coincidence degree requirement is selected. This can avoid an excessively large data amount during image processing due to blind image selection, and also can avoid an excessively large data amount during subsequent matching of existing scenario key point information in the database.

According to the tenth implementation of the fourth aspect, in an eleventh implementation of the fourth aspect, the preset angle spacing is $\theta_{k+1}$.

A calculation formula of the preset angle spacing is $\theta_{k+1}=\theta_k \ \theta_k(\alpha^*-a)$, where $\alpha^*$ is the preset coincidence degree threshold, $\theta_k$ is an angle spacing for image selection at a previous moment, and is a coincidence degree of images when the images are selected based on the angle spacing $\theta_k$.

In this embodiment, the calculation formula of the preset angle spacing is described. This improves solution integrity.

According to the fourth aspect and the first and the second implementations of the fourth aspect, in a twelfth implementation of the fourth aspect, the scenario key point information includes descriptor information corresponding to the natural condition information, and the processing unit is specifically configured to (1) process one target image to obtain a scenario key point, (2) constitute the scenario key point information by using the scenario key point, the target image to which the scenario key point belongs, and the natural condition information corresponding to the target image, and perform the steps (1) and (2) again until the scenario key point information set is constituted.

In this embodiment, a manner of determining the scenario key point information set is described. This improves solution integrity.

According to the fourth aspect and the first and the second implementations of the fourth aspect, in a thirteenth implementation of the fourth aspect, the determining unit is further configured to determine third scenario key point information in the constructed database.

The database construction unit is further configured to, when a FNCS of a third scenario key point corresponding to the third scenario key point information is less than a preset FNCS threshold, delete the third scenario key point information from the database.

In this embodiment, scenario key point management after the database is constructed is described. A scenario key point with a low FNCS value may be deleted, to facilitate database management.

According to the thirteenth implementation of the fourth aspect, in a fourteenth implementation of the fourth aspect, a calculation formula of the FNCS is $$FNCS = \frac{m_i}{M} \log \frac{N}{n_i}, \text{ where } \frac{m_i}{M}$$

is a probability that the scenario key point is used during positioning, and $$\frac{N}{n_i}$$

is a percentage of a quantity of descriptors of the scenario key point in a total quantity of descriptors in an image to which the scenario key point belongs.

In this embodiment, the calculation formula of the FNCS is described. This improves solution implementability.

A fifth aspect of this application provides a positioning method. The method is applied to a visual positioning system, and the method includes an obtaining unit, a determining unit, and a positioning unit.

The obtaining unit is configured to obtain a real-time image.

The determining unit is configured to determine at least one piece of first descriptor information based on the real-time image, where the first descriptor information includes target natural condition information when the real-time image is photographed.

The determining unit is further configured to compare preset descriptor information in a database with the at least one piece of first descriptor information to determine same descriptor information, where the preset descriptor information in the database is obtained by a network device by determining a target image set that meets a preset image coincidence degree requirement, obtaining a scenario key point information set based on the target image set and natural condition information corresponding to each image in the target image set, selecting, from the scenario key point information set, first scenario key point information corresponding to a first scenario key point that meets a preset life value requirement, and then constructing the database based on second descriptor information that is in the first scenario key point information and that corresponds to the target natural condition information, the second descriptor information does not match the preset descriptor information in the database, and the scenario key point information includes descriptor information corresponding to the natural condition information.

The positioning unit is configured to position the real-time image by using the same descriptor information.

In this embodiment, a positioning process after the database is constructed is described. This improves solution practicability.

According to the fifth aspect, in a first implementation of the fifth aspect, the positioning unit is specifically configured to determine first scenario key point information corresponding to the same descriptor information in the database, and obtain, through calculation based on the first scenario key point information and a positioning calculation formula, a location of a target mobile device when the real-time image is photographed.

In this embodiment, a specific manner of positioning the real-time image is described. This improves solution implementability and practicability.

According to the first implementation of the fifth aspect, in a second implementation of the fifth aspect, the positioning calculation formula of the location of the target mobile device when the real-time image is photographed is:

$$r(T_V^G) = \sum_{i=1}^{m} \|\pi_C (T_D^G)^{-1} T_V^G (\pi_C)^{-1} p_i^C - p_i^D\|^2,$$

where $p_i^C$ is pixel coordinates of the first scenario key point in the real-time image, $\pi_C$ is an intrinsic parameter matrix of a camera, $\pi_C$ is used to convert 3D coordinates into pixel coordinates, $T_D^G$ is a pose of an image to which a scenario key point $p_i^D$ in the database belongs relative to a world coordinate system, $p_i^D$ is pixel coordinates of the first scenario key point in the database, a value of i ranges from 1 to n, n is a positive integer, and the first scenario key point corresponds to the first scenario key point information.

In this embodiment, a specific algorithm of the positioning formula is described. This improves solution integrity.

According to the fifth aspect and the first and the second implementations of the fifth aspect, in a third implementation of the fifth aspect, the determining unit is further configured to compare the preset descriptor information in the database with the at least one piece of first descriptor information, to determine different descriptor information.

The network device further includes a database construction unit.

The database construction unit is specifically configured to construct the database based on the different descriptor information.

In this embodiment, the database can be updated based on the different descriptor information in a positioning process. This makes the database more complete, and ensures more accurate positioning.

According to the third implementation of the fifth aspect, in a fourth implementation of the fifth aspect, when second scenario key point information to which the different descriptor information belongs does not exist in the database, the database construction unit is specifically configured to add the second scenario key point information including the different descriptor information to the database.

In this embodiment, a case in which the database is constructed based on the different descriptor information is described. This improves solution practicality.

According to the third implementation of the fifth aspect, in a fifth implementation of the fifth aspect, when second scenario key point information to which the different descriptor information belongs exists in the database, the construction unit is specifically configured to add the different descriptor information to the second scenario key point information in the database.

In this embodiment, another case in which the database is constructed based on the different descriptor information is described. This improves solution integrity.

According to the third implementation of the fifth aspect, in a sixth implementation of the fifth aspect, the determining unit is further configured to determine 3D coordinates of the second scenario key point corresponding to the second scenario key point information, and when a difference between 3D coordinates of each preset scenario key point in the database and the 3D coordinates of the second scenario key point is greater than a first preset threshold, determine that the second scenario key point information does not exist in the database, or when a difference between 3D coordinates of any one preset scenario key point in the database and the 3D coordinates of the second scenario key point is less than a first preset threshold, determine that the second scenario key point information exists in the database.

In this embodiment, a manner of determining whether the second scenario key point exists in the database is described. This improves solution implementability.

A sixth aspect of this application provides a network device. The network device includes a memory, a transceiver, a processor, and a bus system.

The memory is configured to store a program.

The processor is configured to execute the program in the memory, to perform the following steps determining a target image set that meets a preset image coincidence degree requirement, where the target image set includes at least one image, and each image corresponds to one type of natural condition information, obtaining a scenario key point information set based on the target image set and the natural condition information corresponding to each image, where the scenario key point set includes at least one piece of scenario key point information, determining, in the scenario key point information set, first scenario key point information corresponding to a scenario key point whose life value on a single mobile device is greater than a first preset life value threshold, where the life value is used to represent a probability that the scenario key point is a static scenario key point, determining, in the first scenario key point information, second scenario key point information corresponding to a scenario key point whose life value on a plurality of mobile devices is greater than a second preset life value threshold, and when the second scenario key point information does not match preset scenario key point information in a database, constructing the database based on the second scenario key point information.

The bus system is configured to connect the memory and the processor, to enable the memory and the processor to communicate with each other.

In this embodiment, after the second scenario key point information is obtained through screening in the foregoing manner, when second scenario key point information related to a type of natural condition information does not exist in the database, the database is constructed based on the second scenario key point information. This ensures more accurate positioning when the constructed database is used for positioning.

According to the sixth aspect, in a first implementation of the sixth aspect, that the second scenario key point information does not match preset scenario key point information in a database includes the second scenario key point information does not exist in the database, and the processor is specifically configured to add the second scenario key point information to the database, where the second scenario key point information includes target descriptor information about target natural condition information.

In this embodiment, a case in which the database is constructed based on the second scenario key point information is described. This improves solution implementability.

According to the sixth aspect, in a second implementation of the sixth aspect, that the second scenario key point information does not match preset scenario key point information in a database includes the second scenario key point information exists in the database, and the second scenario key point information does not include target descriptor information about target natural condition information, and the processor is specifically configured to add the target descriptor information to the preset second scenario key point information in the database.

In this embodiment, another case in which the database is constructed based on the second scenario key point information is described. This improves solution implementation flexibility.

According to the first or the second implementation of the sixth aspect, in a third implementation of the sixth aspect, the processor is further configured to determine 3D coordinates of the second scenario key point corresponding to the second scenario key point information, and when a difference between 3D coordinates of each preset scenario key point in the database and the 3D coordinates of the second scenario key point is greater than a first preset threshold, determine that the second scenario key point information does not exist in the database, or when a difference between 3D coordinates of any one preset scenario key point in the database and the 3D coordinates of the second scenario key point is less than a first preset threshold, determine that the second scenario key point information exists in the database.

In this embodiment, a manner of determining whether the second scenario key point exists in the database is described. This improves solution implementability.

According to the second implementation of the sixth aspect, in a fourth implementation of the sixth aspect, the processor is further configured to determine at least one piece of descriptor information of the preset second scenario key point in the database, determine whether the at least one piece of descriptor information includes one piece of descriptor information, where a distance between a descriptor corresponding to the one piece of descriptor information and a descriptor corresponding to the target descriptor information is less than a preset distance threshold, and if the at least one piece of descriptor information does not include the one piece of descriptor information, determine that the preset second scenario key point information in the database does not include the target descriptor information.

In this embodiment, a manner of determining whether the target descriptor information exists in the database is described. This improves solution implementability.

According to the sixth aspect and the first and the second implementations of the sixth aspect, in a fifth implementa-tion of the sixth aspect, the life value of the scenario key point on the single mobile device is f, and a calculation formula of f is $$f = \frac{1}{\sigma\sqrt{2n}} e^{-\frac{1}{2}\left(\frac{n-n_0}{\sigma}\right)^2},$$

where n indicates a quantity of times that the scenario key point is observed on the single mobile device, $n_o$ is a preset average value of a quantity of times that a scenario key point is observed, and is a preset variance of the quantity of times that the scenario key point is observed.

In this embodiment, the calculation formula of the life value of the scenario key point on the single mobile device is described. This improves solution implementability.

According to the fifth implementation of the sixth aspect, in a sixth implementation of the sixth aspect, the life value of the scenario key point on the plurality of mobile devices is F, and a calculation formula of F is $$F = \sum_{i=1}^{n} \beta_i f_i,$$

where f is the life value of the scenario key point on the single mobile device, B is a weight coefficient corresponding to each mobile device, and one of the plurality of mobile devices corresponds to one weight coefficient.

In this embodiment, the calculation formula of the life value of the scenario key point on the plurality of mobile devices is described. This improves solution implementability.

According to the sixth implementation of the sixth aspect, in a seventh implementation of the sixth aspect, a calculation formula of $\beta_i$ is $\beta_i=\gamma_t+\gamma_g+\gamma_c$, where $\gamma_t$ is a time continuity index of the scenario key point observed on the plurality of mobile devices, $\gamma_g$ is a geometric continuity index of the scenario key point observed on the plurality of mobile devices, and $\gamma_c$ is a description consistency index of the scenario key point observed on the plurality of mobile devices.

In this embodiment, the calculation formula of the weight coefficient $\beta_i$ is described. This improves solution implementability.

According to the sixth aspect and the first and the second implementations of the sixth aspect, in an eighth implementation of the sixth aspect, the processor is specifically configured to select an image based on a preset distance spacing, and when a difference between a coincidence degree of selected images and a preset coincidence degree threshold is within a preset precision range, determine that the selected images belong to the target image set.

In this embodiment, the image meeting the coincidence degree requirement is selected. This can avoid an excessively large data amount during image processing due to blind image selection, and also can avoid an excessively large data amount during subsequent matching of existing scenario key point information in the database.

According to the eighth implementation of the sixth aspect, in a ninth implementation of the sixth aspect, the preset distance spacing is $d_{k+1}$.

A calculation formula of the preset distance spacing is $d_{k+1}=d_k+d_k(\alpha^* - a)$, where $\alpha^*$ is the preset coincidence degree threshold, $d_k$ is a distance spacing for image selection at a previous moment, and is a coincidence degree of images when the images are selected based on the distance spacing $d_k$.

In this embodiment, the calculation formula of the preset distance spacing is described. This improves solution integrity.

According to the sixth aspect and the first and the second implementations of the sixth aspect, in a tenth implementation of the sixth aspect, the processor is specifically configured to select an image based on a preset angle spacing, and when a difference between a coincidence degree of selected images and a preset coincidence degree threshold is within a preset precision range, determine that the selected images belong to the target image set.

In this embodiment, the image meeting the coincidence degree requirement is selected. This can avoid an excessively large data amount during image processing due to blind image selection, and also can avoid an excessively large data amount during subsequent matching of existing scenario key point information in the database.

According to the tenth implementation of the sixth aspect, in an eleventh implementation of the sixth aspect, the preset angle spacing is $\theta_{k+1}$.

A calculation formula of the preset angle spacing is $\theta_{k+1} = \theta_k \ \theta_k(\alpha^* - a)$, where $\alpha^*$ is the preset coincidence degree threshold, $\theta_k$ is an angle spacing for image selection at a previous moment, and a is a coincidence degree of images when the images are selected based on the angle spacing $\theta_k$.

In this embodiment, the calculation formula of the preset angle spacing is described. This improves solution integrity.

According to the sixth aspect and the first and the second implementations of the sixth aspect, in a twelfth implementation of the sixth aspect, the scenario key point information includes descriptor information corresponding to the natural condition information, and the processor is specifically configured to (1) process one target image to obtain a scenario key point, (2) constitute the scenario key point information by using the scenario key point, the target image to which the scenario key point belongs, and the natural condition information corresponding to the target image, and perform the steps (1) and (2) again until the scenario key point information set is constituted.

In this embodiment, a manner of determining the scenario key point information set is described. This improves solution integrity.

According to the sixth aspect and the first and the second implementations of the sixth aspect, in a thirteenth implementation of the sixth aspect, the processor is further configured to determine third scenario key point information in the constructed database, and when an FNCS of a third scenario key point corresponding to the third scenario key point information is less than a preset FNCS threshold, delete the third scenario key point information from the database.

In this embodiment, scenario key point management after the database is constructed is described. A scenario key point with a low FNCS value may be deleted, to facilitate database management.

According to the thirteenth implementation of the sixth aspect, in a fourteenth implementation of the sixth aspect, a calculation formula of the FNCS is $$FNCS = \frac{m_i}{M} \log \frac{N}{n_i}, \text{ where } \frac{m_i}{M}$$

is a probability that the scenario key point is used during positioning, and $$\frac{N}{n_i}$$

is a percentage of a quantity of descriptors of the scenario key point in a total quantity of descriptors in an image to which the scenario key point belongs.

In this embodiment, the calculation formula of the FNCS is described. This improves solution implementability.

A seventh aspect of this application provides a network device. The network device belongs to a visual positioning system, and the network device includes a memory, a transceiver, a processor, and a bus system.

The transceiver is configured to obtain a real-time image.

The memory is configured to store a program.

The processor is configured to execute the program in the memory, to perform the following steps determining at least one piece of first descriptor information based on the real-time image, where the first descriptor information includes target natural condition information when the real-time image is photographed, comparing preset descriptor information in a database with the at least one piece of first descriptor information to determine same descriptor information, where the preset descriptor information in the database is obtained by the network device by determining a target image set that meets a preset image coincidence degree requirement, obtaining a scenario key point information set based on the target image set and natural condition information corresponding to each image in the target image set, selecting, from the scenario key point information set, first scenario key point information corresponding to a first scenario key point that meets a preset life value requirement, and then constructing the database based on second descriptor information that is in the first scenario key point information and that corresponds to the target natural condition information, the second descriptor information does not match the preset descriptor information in the database, and the scenario key point information includes descriptor information corresponding to the natural condition information, and positioning the real-time image by using the same descriptor information.

The bus system is configured to connect the memory and the processor, to enable the memory and the processor to communicate with each other.

In this embodiment, a positioning process after the database is constructed is described. This improves solution practicability.

According to the seventh aspect, in a first implementation of the seventh aspect, the processor is specifically configured to determine first scenario key point information corresponding to the same descriptor information in the database, and obtain, through calculation based on the first scenario key point information and a positioning calculation formula, a location of a target mobile device when the real-time image is photographed.

In this embodiment, a specific manner of positioning the real-time image is described. This improves solution implementability.

According to the first implementation of the seventh aspect, in a second implementation of the seventh aspect, the positioning calculation formula of the location of the target mobile device when the real-time image is photographed is:

$$r(T_V^G) = \sum_{i=1}^{n} \|\pi_C(T_D^G)^{-1} T_V^G (\pi_C)^{-1} p_i^C - p_i^D\|^2,$$

where $p_i^C$ is pixel coordinates of the first scenario key point in the real-time image, $\pi_c$ is an intrinsic parameter matrix of a camera, $\pi_c$ is used to convert 3D coordinates into pixel coordinates, $T_D^G$ is a pose of an image to which a scenario key point $p_i^D$ in the database belongs relative to a world coordinate system, $p_i^D$ is pixel coordinates of the first scenario key point in the database, a value of i ranges from 1 to n, n is a positive integer, and the first scenario key point corresponds to the first scenario key point information.

In this embodiment, a specific algorithm of the positioning formula is described. This improves solution integrity.

According to the seventh aspect and the first and the second implementations of the seventh aspect, in a third implementation of the seventh aspect, the processor is further configured to compare the preset descriptor information in the database with the at least one piece of first descriptor information to determine different descriptor information, and construct the database based on the different descriptor information.

In this embodiment, the database can be updated based on the different descriptor information in a positioning process. This makes the database more complete, and ensures more accurate positioning.

According to the third implementation of the seventh aspect, in a fourth implementation of the seventh aspect, when second scenario key point information to which the different descriptor information belongs does not exist in the database, the processor is specifically configured to add the second scenario key point information including the different descriptor information to the database.

In this embodiment, a case in which the database is constructed based on the different descriptor information is described. This improves solution practicality.

According to the third implementation of the seventh aspect, in a fifth implementation of the seventh aspect, when second scenario key point information to which the different descriptor information belongs exists in the database, the processor is specifically configured to add the different descriptor information to the second scenario key point information in the database.

In this embodiment, another case in which the database is constructed based on the different descriptor information is described. This improves solution integrity.

According to the third implementation of the seventh aspect, in a sixth implementation of the seventh aspect, the processor is further configured to determine 3D coordinates of the second scenario key point corresponding to the second scenario key point information, and when a difference between 3D coordinates of each preset scenario key point in the database and the 3D coordinates of the second scenario key point is greater than a first preset threshold, determine that the second scenario key point information does not exist in the database, or when a difference between 3D coordinates of any one preset scenario key point in the database and the 3D coordinates of the second scenario key point is less than a first preset threshold, determine that the second scenario key point information exists in the database.

In this embodiment, a manner of determining whether the second scenario key point exists in the database is described. This improves solution implementability.

An eighth aspect of this application provides a computer-readable storage medium. The computer-readable storage medium stores an instruction. When the instruction is run on a computer, the computer is enabled to perform the methods in the foregoing aspects.

A ninth aspect of this application provides a computer program product including an instruction. When the computer program product runs on a computer, the computer is enabled to perform the methods in the foregoing aspects.

BRIEF DESCRIPTION OF DRAWINGS

FIG. 12A is a case in which scenario key point information in an image does not match preset scenario key point information in a database according to this application.

FIG. 12B is another case in which scenario key point information in an image does not match preset scenario key point information in a database according to this application.

FIG. 17 is a table indicating details according to this application.

DESCRIPTION OF EMBODIMENTS

Figure 1:
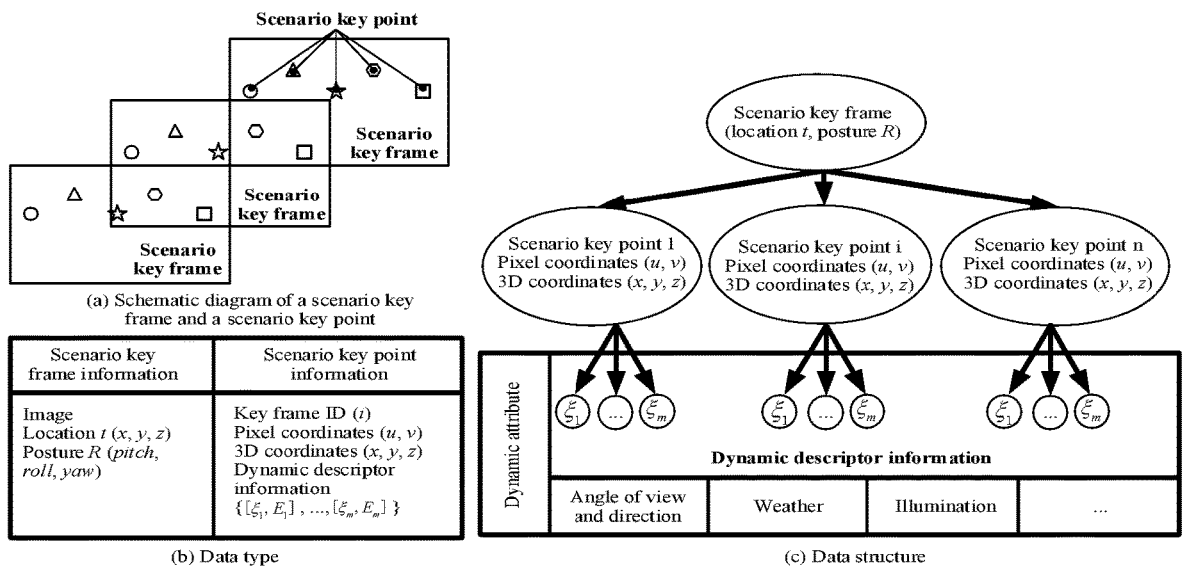
FIG. 1 is a schematic diagram of a relationship between a data structure and a data type in an image database according to this application.

In embodiments of this application, as shown in FIG. 1, a database stores scenario key frame information, scenario key point information, and descriptor information. There is an association relationship among the scenario key frame information, the scenario key point information, and the descriptor information. The scenario key frame information includes an image, a location, and a posture. One scenario key frame has at least one scenario key point. The scenario key point information includes pixel coordinates, 3D coordinates, and descriptor information of a scenario key point, and ID information of a scenario key frame to which the scenario key point belongs. One scenario key point has at least one descriptor. The descriptor information includes a descriptor ξ of a scenario key point in the conventional visual field and a natural condition attribute E of a scenario when the scenario key point is collected. When the natural condition attribute E changes, the descriptor ξ also changes. For example, when a same image is photographed on a cloudy day and a sunny day, descriptors of the photographed images are different. The pixel coordinates, the 3D coordinates, and the ID information of the scenario key frame to which the scenario key point belongs are static attributes of the scenario key point, and do not vary with an external environment.

In the embodiments of this application, different natural conditions have different descriptor information. The different natural conditions are different angles of view and directions, different weather, and/or different illumination conditions. The different natural conditions may alternatively be another case. This is not specifically limited herein.

The embodiments of this application are mainly applied to a visual positioning system. A principle of visual positioning is as follows. A scenario key point of a photographed image is compared with a scenario key point in a database, if the scenario key point of the photographed image matches a corresponding scenario key point in the database, the scenario key points are considered as a same scenario key point, and then 3D coordinates of the matched scenario key point in the database are used for positioning. This application may be applied to positioning in a moving process of a mobile device such as an unmanned aerial vehicle, a vehicle-to-everything (V2X) vehicle, or a mobile phone.

Figure 2:
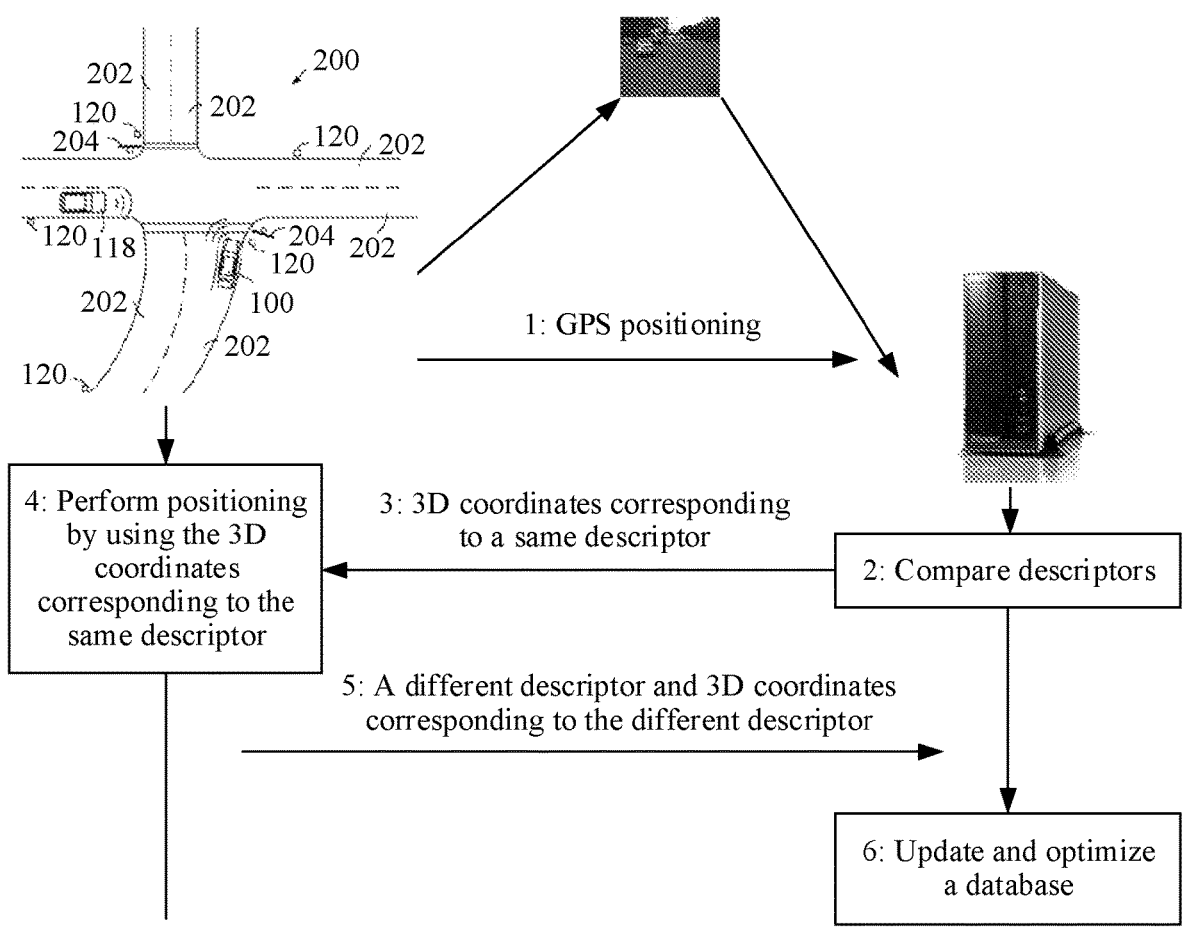
FIG. 2 is a schematic diagram of applying an embodiment of this application to a vehicle.

As shown in FIG. 2, real-time positioning of a vehicle in a running process is used as an example. First, real-time image information of the vehicle A in the running process and positioning information obtained through positioning in a non-visual positioning manner such as a GPS are determined. Then, the vehicle A sends a real-time image to the server. The vehicle A may send the positioning information to the server, and after receiving the positioning information, the server determines natural condition information of a corresponding location. Alternatively, the vehicle A determines natural condition information based on the positioning information, and then sends the natural condition information to the server. The server finds a plurality of pieces of descriptor information about the natural condition information in the real-time image, and then compares a plurality of determined descriptors with descriptors that are preset and stored in a database. The database belongs to the server, and is configured to store a scenario key frame and scenario key point information of the scenario key frame.

When the database includes descriptors that are the same as those in the real-time image, the same descriptors in the database are found, and the descriptor comparison is successful. This proves that scenario key points to which the descriptors belong are a same scenario key point. 3D coordinates of the same scenario key point are found, and the vehicle can be positioned by using the 3D coordinates of the same scenario key point. The descriptors in the real-time image may be completely the same as those in the database. In this case, the 3D coordinates of the scenario key point to which the same descriptors belong are directly used for positioning. If corresponding descriptors in the database can be found for only some descriptors in the real-time image, 3D coordinates of a scenario key point to which the descriptors belong are first used for positioning. After the positioning is completed, different descriptor information is obtained, and then the different descriptor information is updated to the database, to optimize the database. In this way, the optimized database can subsequently be used for more accurate positioning.

Before positioning is implemented in this application scenario, there is still a database construction process. In the database construction process, based on a large quantity of images, a scenario key point in an image is selected based on a life value algorithm, to obtain a large amount of scenario key point information. Then, the obtained scenario key point information is compared with existing scenario key point information in the database, to update and optimize the database, and scenario key information that does not exist in the database is updated to the database. The life value algorithm can accurately obtain representative scenario key points through screening, so that the database can be used for more accurate visual positioning.

Figure 3:
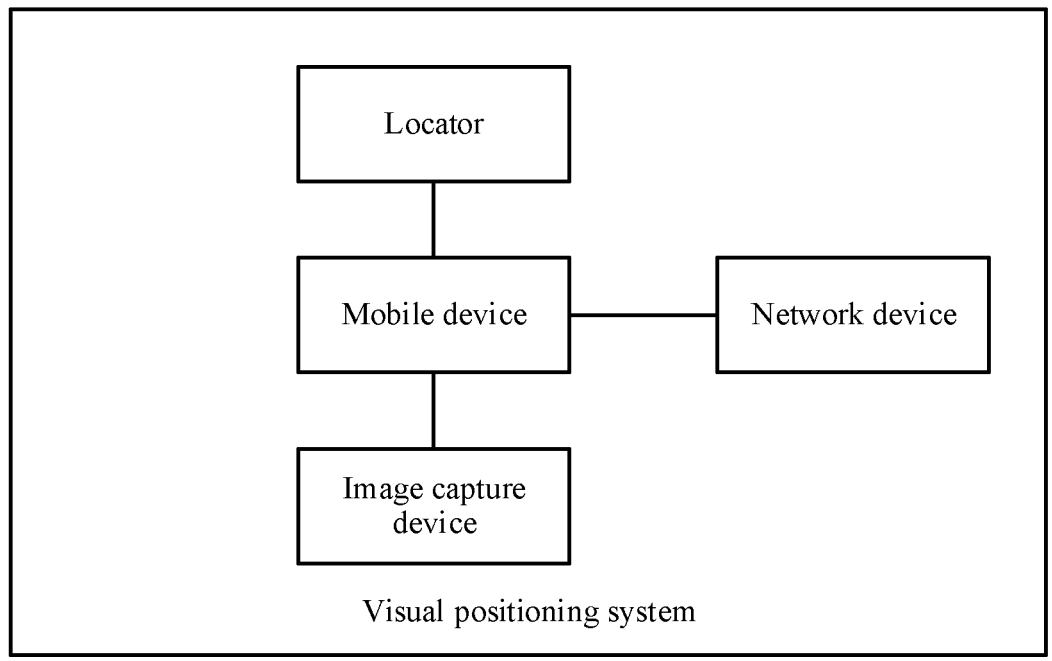
FIG. 3 is a schematic structural diagram of a visual positioning system according to this application.

FIG. 3 shows a possible structure of a visual positioning system. A locator is configured to obtain positioning information of a mobile device, and optionally, may further obtain posture information. An image capture device is configured to capture an image of the mobile device. The mobile device is configured to receive the image sent by the image capture device and the positioning information sent by the locator, and then send the image and the positioning information to a network device. Alternatively, the network device may directly obtain the image and the positioning information without using the mobile device, in other words, the network device is directly connected to the image capture device and the locator. This is not specifically limited herein. The network device is configured to perform, after receiving the image, scenario key point comparison to implement positioning, and update and manage a database of the network device.

Optionally, in a possible case, the mobile device sends the positioning information to the network device. In another possible case, after determining natural condition information based on the positioning information, the mobile device sends the natural condition information to the network device, and does not send the positioning information. This is not specifically limited herein.

Figure 4:
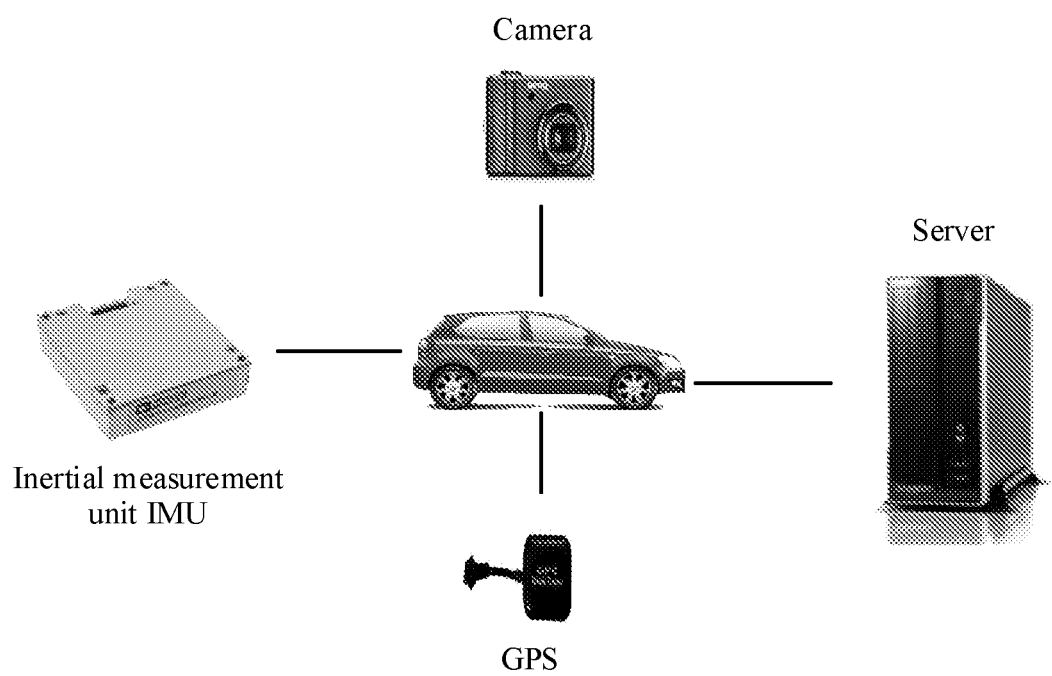
FIG. 4 is another schematic structural diagram of a visual positioning system according to this application.

Based on the visual positioning system shown in FIG. 3, a possible entity structure is shown in FIG. 4.

The locator may specifically be a GPS, a camera, a laser radar, a millimeter wave radar, or an IMU. The IMU may obtain the positioning information, and may further obtain a posture of the mobile device. The locator may be a component of the mobile device, or may be an external device connected to the mobile device. This is not specifically limited herein.

The mobile device may specifically be a vehicle, a mobile phone, an unmanned aerial vehicle, or the like.

The image capture device may specifically be a camera. The image capture device may be a component of the mobile device, or may be an external device connected to the mobile device. This is not specifically limited herein.

The network device may specifically be a cloud server, or may be a mobile device having a data processing capability. This is not specifically limited herein. The database of the network device has a preset data model used for visual positioning, as shown in FIG. 1. The data model describes a relationship among a scenario key frame, a scenario key point, and a descriptor.

Figure 5:
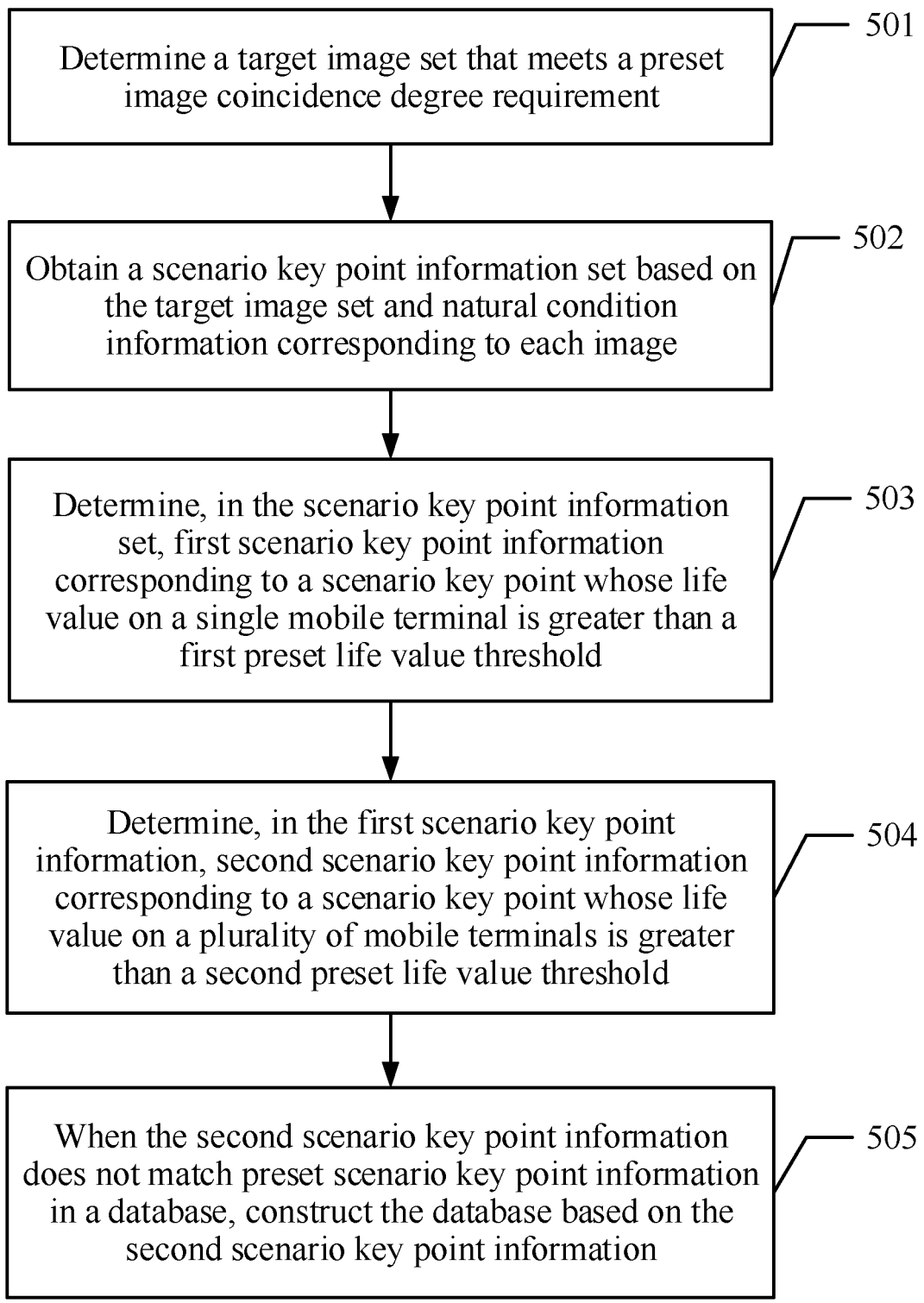
FIG. 5 is a schematic diagram of an embodiment of a database construction method according to this application.

Based on the foregoing structures of the network device and the mobile device, the embodiments of this application provide a database construction method and a positioning method. This application includes two parts. One part is a database construction process on a network device side, with a purpose of properly managing the database to better use the database for visual positioning. The other part is a visual positioning process after the database is constructed. The following separately describes the two parts. The database construction process is shown in FIG. 5.

501. Determine a target image set that meets a preset image coincidence degree requirement.

A network device obtains data information. In this embodiment, the data information may be image information, location information, a posture, or natural condition information. This is not specifically limited herein.

A method used by the network device to obtain image information of a mobile device in a running process is as follows. A camera installed on the mobile device may be used to obtain an image photographed by the camera, or the mobile device may have an image obtaining function, and the network device obtains an image photographed by the mobile device. In the running process, the mobile device photographs an image at an interval of specific duration. The obtained image is mainly image information of an ambient environment in a moving process of the mobile device. The selected duration is manually set, and may be 0.01 seconds (s), 0.001 s, or the like. This is not specifically limited herein.

The image information includes at least one image. A posture and real-time location information of the mobile device are different when each image is photographed. The posture indicates a driving angle and a driving direction of the mobile device. The real-time location information of the mobile device may be obtained by using a GPS, a laser radar, a millimeter-wave radar, and/or an IMU.

In this embodiment, each image one-to-one corresponds to a location and a posture of the mobile device when the image is photographed. For details, refer to FIG. 17.

After the image information is obtained, the target image set that meets the preset coincidence degree requirement is selected based on the data information. Optionally, a process for determining the target image set may be as follows. The mobile device may first perform screening on obtained images based on the preset coincidence degree requirement, and then send a screening result to the network device. The target image screening process may alternatively be performed by the network device. In an embodiment, the network device performs screening after obtaining the images, to obtain the target image set. This is not specifically limited herein.

Figure 6:
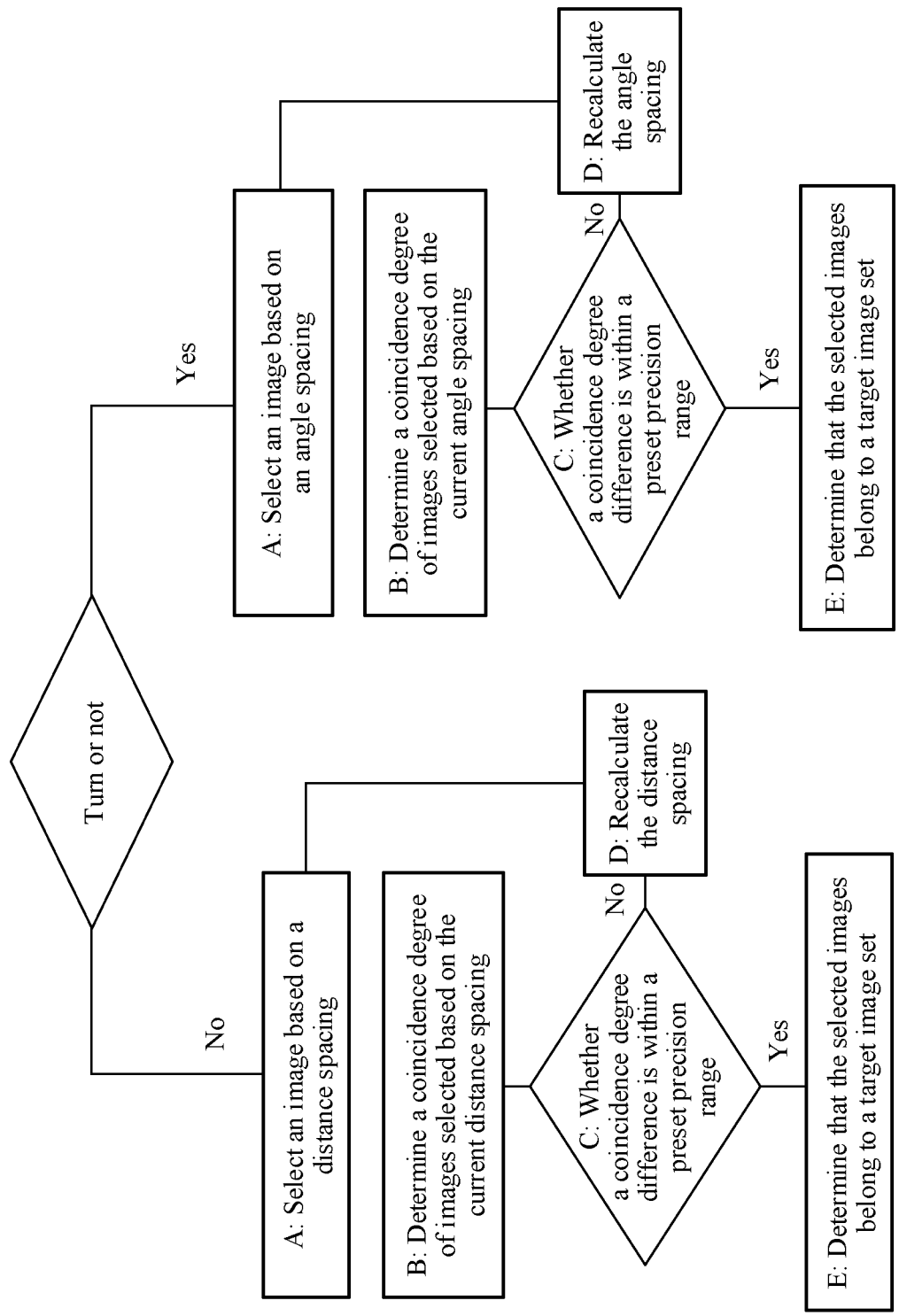
FIG. 6 is a schematic diagram of an embodiment of selecting a target image set according to this application.

It should be noted that, when the mobile device goes straight and turns, bases for determining the target image set are different. When the vehicle goes straight, the target image set that meets the requirement needs to be determined based on a specific distance spacing. When the vehicle turns, the target image set that meets the requirement needs to be determined based on a specific angle spacing. Specific steps are shown in FIG. 6.

A. Select an image based on a distance spacing (or angle spacing) $d_k$.

A distance spacing or an angle spacing is defined in advance, and an image to be selected is determined based on the spacing. For example, on a straight road, one image is obtained each time the vehicle drives for 1 m. Alternatively, on a curved road, one image is obtained each time a driving angle of the vehicle changes by 5 degrees.

B. Determine a coincidence degree α of images selected based on the current distance spacing (or angle spacing) $d_k$.

After the images are selected, a coincidence degree of two adjacent images in the selected images is calculated by using the following formula:

coincidence degree of images α=quantity $n_{old}$ of same scenario key points in a current image and an adjacent image/quantity $n_{new}$ of different scenario key points in the current image and the adjacent image, where a quantity of scenario key points in the current image is $n_{total}$, and $n_{total} = n_{old} n_{new}$.

C. Determine whether a difference between the coincidence degree of the selected images and a preset coincidence degree threshold is within a preset precision range.

A calculation formula is $|α^* - α| < \Delta_α$.

In the foregoing formula, $α^*$ is the preset coincidence threshold, and $α^*$ is usually 1. $\Delta_α$ is a preset precision value. A value range of $\Delta_α$ is 0.1 to 0.2. $α^*$ and $\Delta_α$ may alternatively be set to other values. This is not specifically limited herein. The preset precision range is 0 to $\Delta_α$.

D. If the difference between the coincidence degree of the selected images and the preset coincidence degree threshold is not within the preset precision range, recalculate the distance spacing (or angle spacing).

If the difference between the coincidence degree of the selected images and the preset coincidence degree threshold is not within the preset precision range, the distance spacing for image selection is redefined. First, a distance spacing (or angle spacing) $\Delta d_k$ that needs to be increased is determined.

When the mobile device goes straight, $\Delta d_k = d_k(α^* - α)$.

Where $d_k$ is a distance spacing for image selection at a previous moment, and $d_k$, $α^*$, and α have been obtained in the preceding steps.

A new distance spacing for scenario key frame selection is obtained, namely, $d_{k+1} = d_k + \Delta d_k$.

Where $d_{k+1}$ is re-determined as the distance spacing for obtaining a scenario key frame image. The foregoing process starting with the step A is performed again, until a distance spacing $d_{k+n}$ is obtained, where a coincidence degree meets a preset condition when an image is selected based on the distance spacing.

E. If the difference between the coincidence degree of the selected images and the preset coincidence degree threshold is within the preset precision range, determine that the selected images belong to the target image set.

If the difference between the coincidence degree of the selected images and the preset coincidence degree threshold is within the preset precision range, an image selected based on the distance spacing $d_k$ is a target image. The target image set is obtained by selecting a plurality of target images based on $d_k$.

When the mobile device turns, an angle spacing that meets the coincidence degree requirement is first determined, and then image screening is performed. A specific process is similar to a manner of image screening based on the distance spacing. Details are not described herein again.

502. Obtain a scenario key point information set based on the target image set and natural condition information corresponding to each image.

The network device processes the target image set to obtain a scenario key point. The scenario key point may be considered as a sample whose grayscale value is remarkably different from a grayscale value of another sample in the target image. Then, the network device determines, based on a location of the mobile device when each target image is photographed, natural condition information of the location, and establishes a correspondence between a scenario key point and natural condition information, to obtain scenario key point information. It may be understood that, in addition to the natural condition information, the scenario key point information further includes 3D coordinates, pixel coordinates, and descriptor information of the scenario key point.

In this embodiment, a plurality of images may include a same scenario key point. Therefore, a scenario key point may one-to-one correspond to natural condition information, or one scenario key point may correspond to a plurality of types of natural condition information. The descriptor information varies with the natural condition information. Therefore, one piece of scenario key point information may include a plurality of pieces of descriptor information.

For example, the target image set includes a target image 1 and a target image 2. The target image 1 is photographed on a sunny day with an illumination intensity of 400 lx. The target image 2 is photographed on a cloudy day with an illumination intensity of 300 lx. The target image 1 includes a scenario key point 1 and a scenario key point 2. The target image 2 includes the scenario key point 2 and a scenario key point 3. The target image set is parsed to obtain the scenario key point 1, the scenario key point 2, and the scenario key point 3. The scenario key point 1 has one descriptor that corresponds to natural condition information of the target image 1. The scenario key point 2 has two descriptors that respectively correspond to the natural condition information of the target image 1 and natural condition information of the target image 2. The scenario key point 3 has one descriptor that corresponds to the natural condition information of the target image 2.

After a scenario key point set is obtained, a representative scenario key point is selected. It may be understood that positioning performed by using a static object is more accurate. Therefore, the representative scenario key point may be a scenario key point related to a static object such as a sign board, a road sign, or a building on a road. Specifically, the representative scenario key point is selected based on a life value of the scenario key point. The life value may indicate a probability that the scenario key point is a static scenario key point. A larger life value indicates a higher probability that the scenario key point is the static scenario key point. First, the life value of the scenario key point is calculated from a perspective of a single vehicle, and primary scenario key point screening is performed. Second, because one scenario key point is usually observed by a plurality of mobile devices, a life value of a scenario key point obtained through the primary screening needs to be calculated from a perspective of the plurality of mobile devices, and secondary screening is performed. The plurality of mobile devices mean at least two mobile devices. For details, refer to the following steps 503 and 504 in this embodiment.

503. Determine, in the scenario key point information set, first scenario key point information corresponding to a scenario key point whose life value on a single mobile device is greater than a first preset life value threshold.

Figure 7:
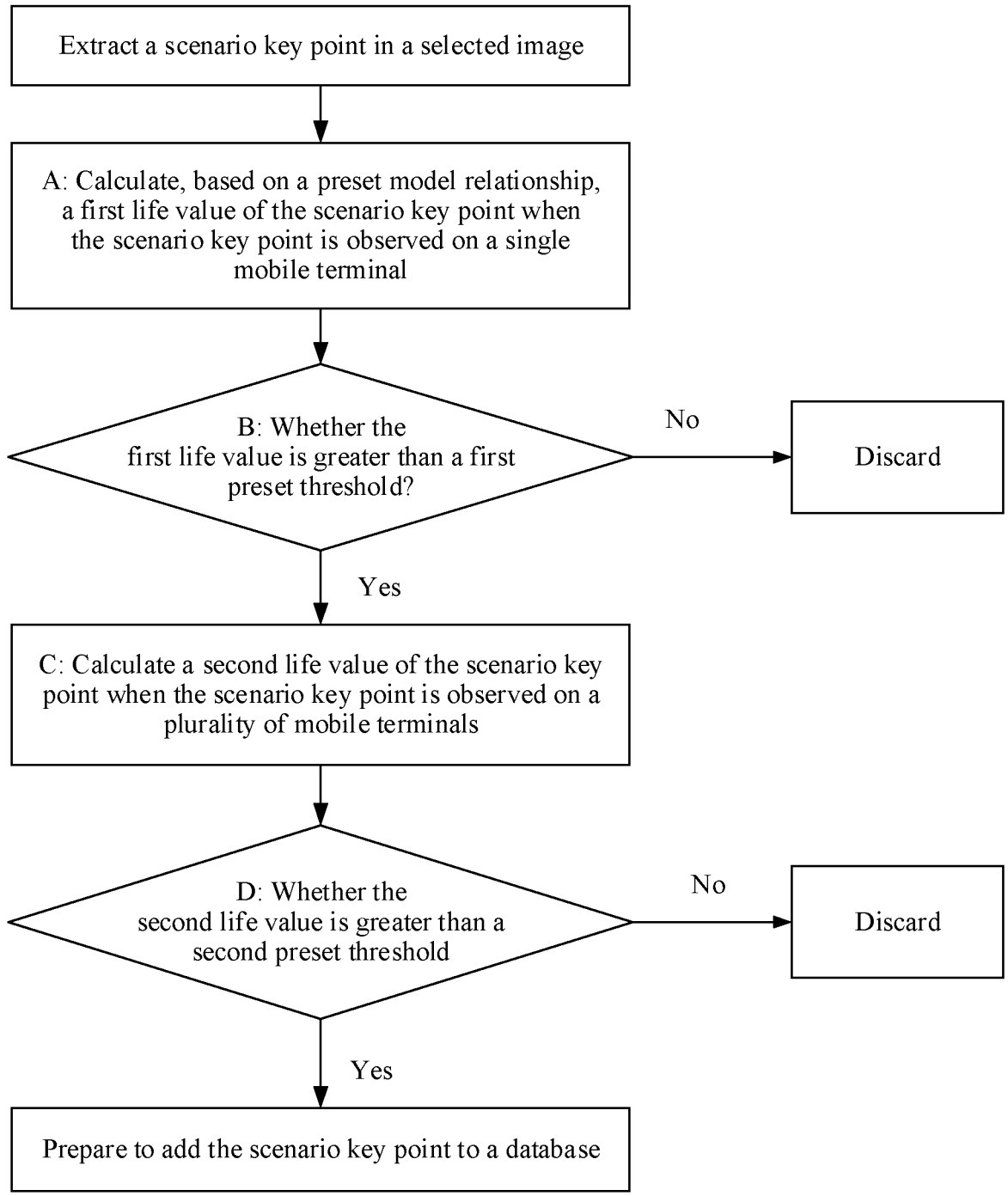
FIG. 7 is a schematic diagram of an embodiment of selecting second scenario key point information according to this application.

Referring to FIG. 7, a scenario key point screening process includes the following steps.

A. Calculate, based on a preset model relationship, a first life value of the scenario key point when the scenario key point is observed on the single vehicle.

Figure 8:
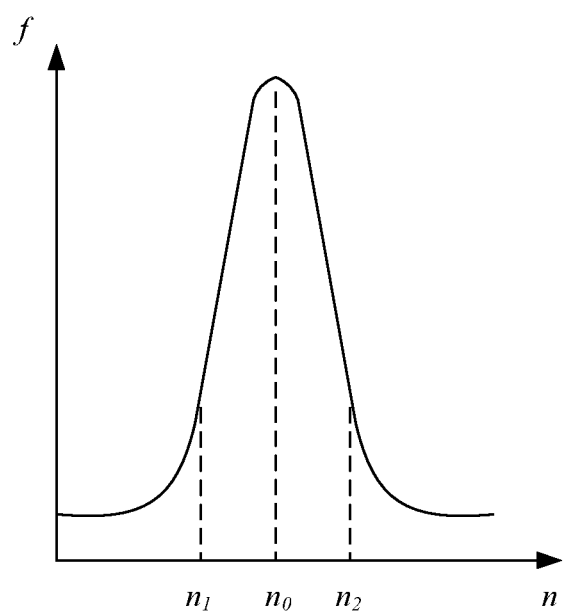
FIG. 8 is a schematic diagram of a relationship between a life value of a scenario key point and a quantity of times that the scenario key point is observed according to this application.

First, model training is performed to obtain a relationship between a quantity of times that the scenario key point is observed and a life value of the scenario key point, as shown in FIG. 8. It can be learned that a normal curve is presented between the quantity n of times that the scenario key point is observed and the life value f of the scenario key point. From a perspective of the single mobile device, when a scenario key point appears only in a few frames, it is very likely that the scenario key point is noise and needs to be discarded. When a scenario key point appears in a relatively large quantity of frames, it is very likely that the scenario key point is an image of another mobile device that moves synchronously with the mobile device in this embodiment, and also needs to be discarded.

An average value $n_0$ and a variance $\sigma$ of the quantity of times that the scenario key point is observed are determined according to FIG. 8. Then, a first life value of each scenario key point in the scenario key point set is separately calculated. A calculation formula is:

$$f = \frac{1}{\sigma\sqrt{2\pi}} e^{-\frac{1}{2}\left(\frac{n-n_0}{\sigma}\right)^2}.$$

In the foregoing formula, n indicates a quantity of times that a scenario key point in the scenario key point set is observed on the single vehicle.

B. Determine whether the first life value is greater than the first preset threshold.

When a first life value of a scenario key point is greater than the first preset threshold, the scenario key point is a first scenario key point, and then whether the first scenario key point obtained after the primary screening meets a life value requirement is determined from the perspective of the plurality of mobile devices.

If a first life value of a scenario key point is less than or equal to the first preset threshold, it indicates that the first life value of the scenario key point is excessively low, and the scenario key point is discarded.

504. Determine, in the first scenario key point information, second scenario key point information corresponding to a scenario key point whose life value on the plurality of mobile devices is greater than a second preset life value threshold.

C. Calculate a second life value of the scenario key point when the scenario key point is observed on the plurality of mobile devices.

The first scenario key point obtained by the plurality of mobile devices may be determined based on 3D coordinates or pixel coordinates of the scenario key point. Alternatively, whether scenario key points obtained by the plurality of mobile devices are a same scenario key point may be determined in another manner. This is not specifically limited herein. For example, in the scenario key points obtained by the plurality of mobile devices, scenario key points whose 3D coordinates are the same or whose 3D coordinates difference is within a preset difference range are a same scenario key point.

A second life value of the first scenario key point observed by the plurality of mobile devices is calculated based on the following formula:

$$F = \sum_{i=1}^{n} \beta_i f_i.$$

In the foregoing formula, f is the life value of the scenario key point on the single mobile device, and B is a weight coefficient corresponding to each mobile device. For a scenario key point, a weight coefficient corresponding to each of the plurality of mobile devices is usually different. The weight coefficient $\beta_i$ is calculated based on the following formula $\beta_i = \gamma_t \gamma_g \gamma_c$, where $\gamma_t$ is a time continuity index of the scenario key point observed on the plurality of mobile devices, $\gamma_g$ is a geometric continuity index of the scenario key point observed on the plurality of mobile devices, $\gamma_c$ is a description consistency index of the scenario key point observed on the plurality of mobile devices, and $$\gamma_t = \begin{cases} 1 & \Delta_t \le \Delta_1 \\ \frac{1}{2}\left[1 + \tanh\left(\frac{1}{\Delta_t - \Delta_1} + \frac{1}{\Delta_t - \Delta_2}\right)\right] & \Delta_1 < \Delta_t < \Delta_2 \\ 0 & \Delta_t \ge \Delta_2 \end{cases}.$$

$\Delta_t$ is a time interval for a same key point observed by different mobile devices, and $\Delta_1$ and $\Delta_2$ are preset values. It can be learned that the time interval for the same scenario key point observed by the different mobile devices is negatively correlated to $\gamma_t$.

Calculation processes of $\gamma_g$ and $\gamma_c$ are similar to a calculation process of $\gamma_t$. Details are not described herein again. It should be noted that, when the geometric continuity index $\gamma_g$ is calculated, is defined as a Euclidean distance for the same scenario key point observed by the different mobile devices. When the description consistency $\gamma_c$ is calculated, n is defined as a descriptor distance for the same scenario key point observed by the different mobile devices.

D. Determine whether the second life value is greater than the second preset threshold.

The first scenario key point whose second life value is greater than or equal to the second preset threshold is determined as a second scenario key point. The second scenario key point is a representative mature scenario key point, and information about the second scenario key point is to be added to a database.

If the life value of the first scenario key point is less than the second preset life value threshold, the first scenario key point is discarded.

505. When the second scenario key point information does not match preset scenario key point information in the database, construct the database based on the second scenario key point information.

After the second scenario key point information to be added to the database is determined, whether the second scenario key point information exists in the database further needs to be determined, to prevent scenario key point information from being repeatedly added to the database.

The second scenario key point information is compared with the preset scenario key point information in the database. If the second scenario key point information does not match the preset scenario key point information in the database, the database is constructed based on the second scenario key point information.

In this embodiment, after the second scenario key point information is obtained through screening in the foregoing manner, when second scenario key point information related to a type of natural condition information does not exist in the database, the database is constructed based on the second scenario key point information. This ensures more accurate positioning when the constructed database is used for positioning.

Figure 9:
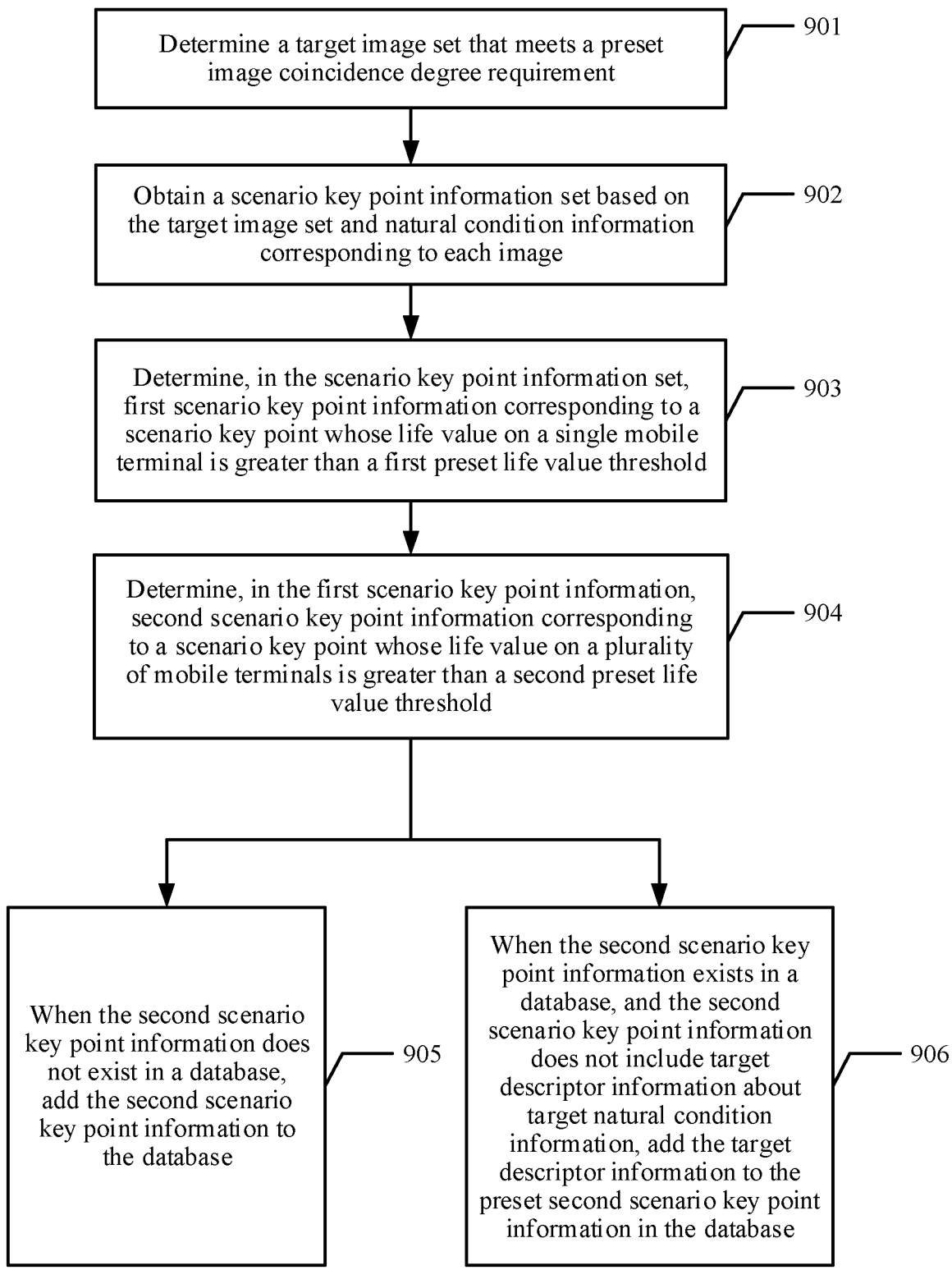
FIG. 9 is a schematic diagram of another embodiment of a database construction method according to this application.

In this embodiment, one piece of scenario key point information includes 3D coordinates, pixel coordinates, natural condition-related descriptor information of a scenario key point, and an ID of a key frame to which the scenario key point belongs. The 3D coordinates, the pixel coordinates, and the ID of the key frame to which the scenario key point belongs are static indexes of the scenario key point, and are usually fixed. The descriptor information is a dynamic index, and varies with a natural condition. Therefore, a possible case in which the preset scenario key point information in the database does not match the second scenario key point information is that the second scenario key point information does not exist in the database, or that the second scenario key point information exists in the database, but descriptor information included in the second scenario key point information in the database is different from that included in the second scenario key point information determined in the image. Referring to FIG. 9, the following provides description.

901. Determine a target image set that meets a preset image coincidence degree requirement.

902. Obtain a scenario key point information set based on the target image set and natural condition information corresponding to each image.

903. Determine, in the scenario key point information set, first scenario key point information corresponding to a scenario key point whose life value on a single mobile device is greater than a first preset life value threshold.

904. Determine, in the first scenario key point information, second scenario key point information corresponding to a scenario key point whose life value on a plurality of mobile devices is greater than a second preset life value threshold.

905. When the second scenario key point information does not exist in a database, add the second scenario key point information to the database.

Whether a second scenario key point exists in the database is determined. If the second scenario key point does not exist in the database, the corresponding second scenario key point information does not exist in the database either. Information about the second scenario key point is added to the database.

Figure 10:
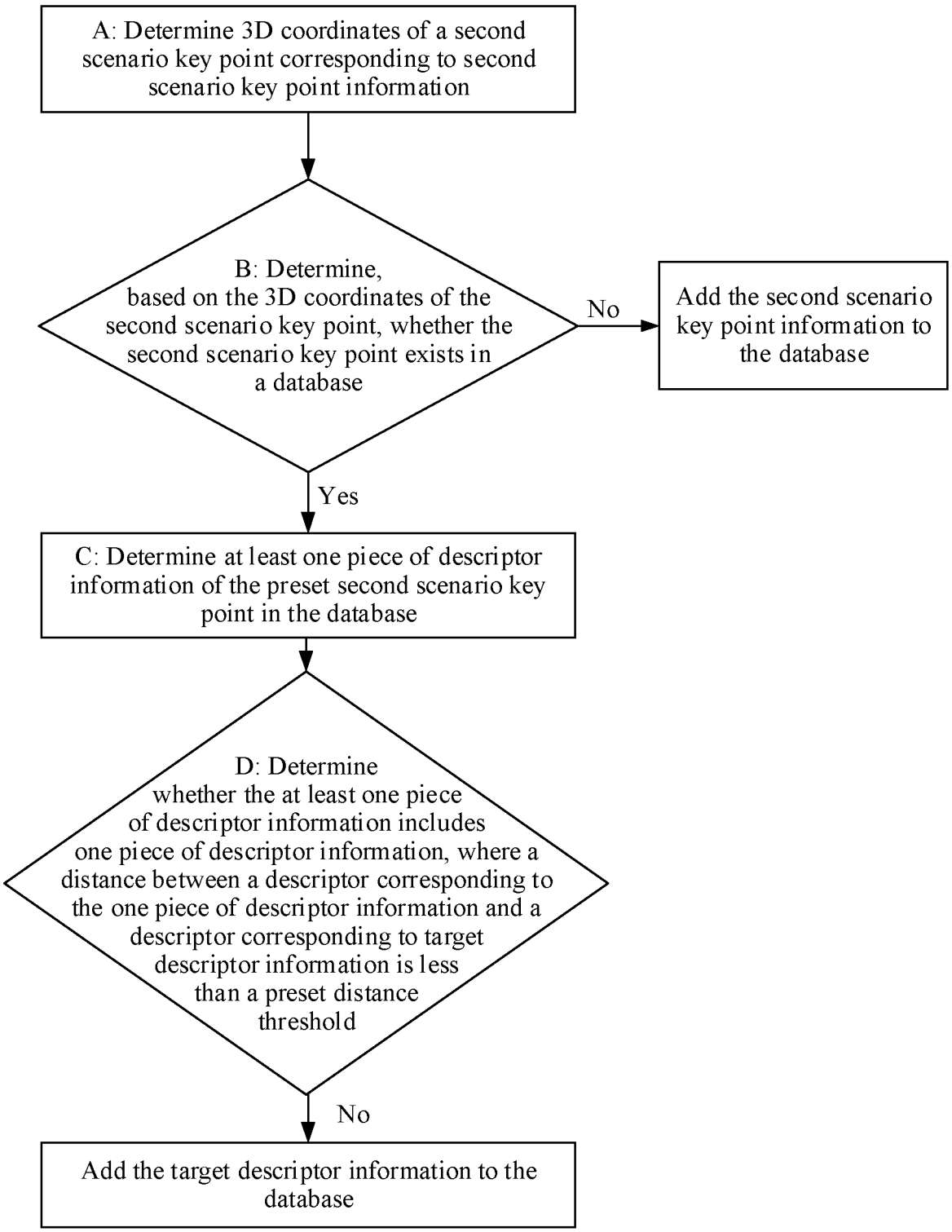
FIG. 10 is a schematic diagram of an embodiment of determining whether a scenario key point exists in a database according to this application.

Referring to FIG. 10, the determining whether a second scenario key point exists in a database specifically includes the following steps.

A. Determine 3D coordinates of the second scenario key point corresponding to the second scenario key point information.

First, the 3D coordinates of the second scenario key point corresponding to the second scenario key point information are determined. A scenario key point may be observed by the plurality of mobile devices. Therefore, when a scenario key point is observed by the plurality of mobile devices, 3D coordinates of the scenario key point observed by the plurality of mobile devices are first obtained, and then an average value $\bar{p}$ and a standard deviation $\sigma$ of the plurality of 3D coordinates are calculated. 3D coordinates that are of the scenario key point and that are measured by each vehicle are compared with the average value $\bar{p}$. When a Euclidean distance between the measured 3D coordinates and the average value is greater than $3\sigma$, it indicates that an error of the 3D coordinates measured by the vehicle is relatively large, and the 3D coordinates are deleted. Then, the average value p and standard deviation $\sigma$ of the 3D coordinates of the scenario key point are recalculated by using remaining 3D coordinates, and whether Euclidean distances between all the 3D coordinates and a recalculated average value $\bar{p}$ are less than 3a is determined. This operation is repeated until Euclidean distances between all remaining 3D coordinates and an average value p are less than 3a, and the average value p of the coordinates at this time is output as the 3D coordinates of the scenario key point.

For example, there are N vehicles. 3D coordinates of a same scenario key point observed by the N vehicles are 3D1, 3D2, 3D3, . . . , and 3Dn respectively.

First, $(3D1+3D2+3D3+\ldots 3Dn)/n=\bar{p}$ is obtained through calculation.

Whether $3D1-\bar{p}<3\sigma, 3D2-\bar{p}<3\sigma, \ldots,$ and $3Dn-\bar{p}<3\sigma$ are determined.

If yes, p is the 3D coordinates of the scenario key point. If a Euclidean distance between at least one of the 3D coordinates (for example, 3D1) and $\bar{p}$ is greater than $3\sigma$, 3D1 is deleted. After that, 3D2, 3D3, ..., and 3Dn are averaged to obtain $\bar{p}$, and then the foregoing steps are performed again. It should be noted that $3\sigma$ is a fixed value and is preset by a system. A value of $3\sigma$ is not specifically limited herein.

B. Determine, based on the 3D coordinates of the second scenario key point, whether the second scenario key point exists in the database.

After the 3D coordinates of the scenario key point are obtained through calculation, the 3D coordinates of the scenario key point are compared with 3D coordinates of any one scenario key point in the image database. When a Euclidean distance between the 3D coordinates of the scenario key point and the 3D coordinates of the scenario key point in the image database is less than $\sigma_d$, it is determined that the scenario key point and the scenario key point in the database are a same scenario key point. When a Euclidean distance between 3D coordinates of each preset scenario key point in the database and the 3D coordinates of the scenario key point is greater than a first preset threshold, it is determined that the scenario key point is a new scenario key point, and new scenario key point information (in other words, the second scenario key point information) is added to the database. A specific value of $\sigma_d$ is not limited herein. In addition, in this embodiment, a quantity of new scenario key points is not limited either.

The new scenario key point information added to the database includes pixel coordinates, 3D coordinates, a key frame ID, and target descriptor information of the new scenario key point. The new scenario key point information may further include descriptor information other than the target descriptor information. This is not specifically limited herein.

Referring to FIG. 12A, for example, compared with an image, the database does not include a scenario key point 4, and further does not include a descriptor 10 of the scenario key point 4. The descriptor 10 is a different descriptor in this embodiment. In this case, the second scenario key point information including the different descriptor, namely, information about the scenario key point 4, is added to the database.

Alternatively, 906. When the second scenario key point information exists in a database, and the second scenario key point information does not include target descriptor information about target natural condition information, add the target descriptor information to the preset second scenario key point information in the database.

After whether a second scenario key point exists in the database is determined based on the steps A and B in the foregoing step 905 in this embodiment, if the second scenario key point information exists in the database, whether the second scenario key point includes the target descriptor information about the target natural condition information is determined. Details are as follows.

C. Determine at least one piece of descriptor information of the preset second scenario key point in the database.

When the second scenario key point exists in the database, because the second scenario key point has different descriptors for different natural condition information, the preset second scenario key point information in the database includes the at least one piece of descriptor information.

D. Determine whether the at least one piece of descriptor information includes one piece of descriptor information, where a distance between a descriptor corresponding to the one piece of descriptor information and a descriptor corresponding to the target descriptor information is less than a preset distance threshold.

Whether the at least one piece of descriptor information in the database includes the one piece of descriptor information is determined, where the distance between the descriptor corresponding to the one piece of descriptor information and the descriptor corresponding to the target descriptor information of the second scenario key point determined in the image is less than the preset distance threshold.

In this embodiment, the target descriptor information is descriptor information about the target natural condition information. In a possible case, the descriptor corresponding to the target descriptor information is a descriptor that has a minimum sum of distances away from other descriptors in all descriptors of the scenario key point to which the target descriptor information belongs. In another possible case, the descriptor corresponding to the target descriptor information is any one of all descriptors of the scenario key point to which the target descriptor information belongs.

When a distance between a target descriptor and each of at least one descriptor in the database is greater than the preset distance threshold, it is determined that the target descriptor is a new descriptor. When a distance between a target descriptor and one descriptor in the database is less than or equal to the preset distance threshold, it is determined that the target descriptor and the descriptor are a same descriptor.

If the target descriptor is the new descriptor, information about the target descriptor is stored in the database. If the target descriptor and the descriptor are the same descriptor, no update is performed. In this embodiment, a quantity of new descriptors is not limited herein.

Referring to FIG. 12B, for example, the database includes a scenario key point 1, a scenario key point 2, and a scenario key point 3 that are the same as those in a target image, but the scenario key point 3 in the database does not include a target descriptor, namely, a descriptor 9, of the scenario key point 3 in the image. In this case, descriptor information corresponding to the different descriptor 9 is added to the database.

In this embodiment, two cases of scenario key point matching in the image and the database are described. In this way, when database information is updated and improved, only a part different from the scenario key point information in the database is updated. This avoids a large increase of a data amount in the database, and facilitates database management.

Further, after the scenario key point or the descriptor is updated, to optimize the database and manage the database more easily, some scenario key points may further be deleted by using a screening condition, and only a scenario key point that meets a requirement is retained. The scenario key point is retained according to two rules.

a. Maximally retain a scenario key point that is frequently used during positioning. An index MNI is used for representation. MNI is calculated based on the following formula:

$$MNI = \frac{m_i}{M}.$$

In the foregoing formula, M is a total quantity of times of positioning at a location of a scenario key point, and $m_i$ indicates a quantity of times that the scenario key point is used during positioning.

b. Maximally retain a scenario key point with little dynamic descriptor information. An index FNI is used for representation. FNI is calculated based on the following formula:

$$FNI = \log \frac{N}{n_i}.$$

In the foregoing formula, $$\frac{N}{n_i}$$

is a percentage of a quantity of descriptors of a scenario key point in a total quantity of descriptors in a scenario key frame to which the scenario key point belongs.

According to the foregoing two rules, a calculation formula of the FNCS is obtained:

$$FNCS = \frac{m_i}{M} \log \frac{N}{n_i}.$$

A larger FNCS value of a scenario key point indicates that the scenario key point is more frequently used and has fewer descriptors, indicating that the scenario key point robustly adapts to a natural condition change. Therefore, a scenario key point with a low FNCS needs to be deleted during scenario key point management.

Figure 11:
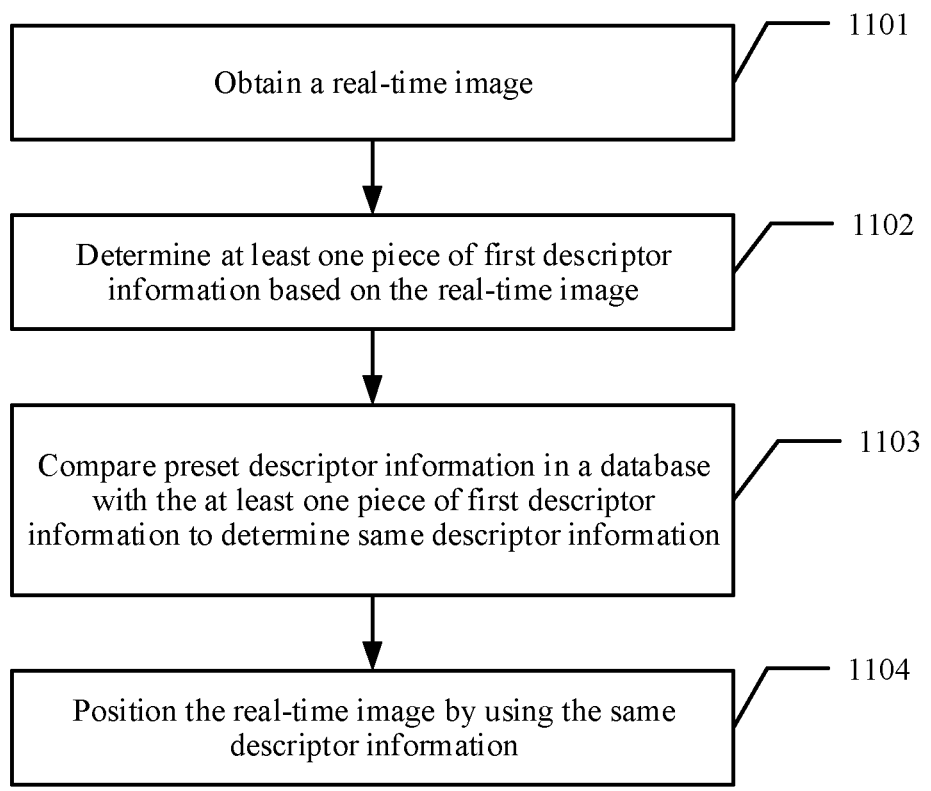
FIG. 11 is a schematic diagram of an embodiment of a positioning method according to this application.

The foregoing describes the database construction process. Referring to FIG. 11, the following describes use and synchronous update of the database during positioning.

1101. Obtain a real-time image.

In a running process of a target mobile device, image information of the target mobile device is usually obtained in real time by a camera installed on the target mobile device, or by a camera installed on a road based on a specific distance spacing. It may be understood that the obtained real-time image is an image of a road and an environment around a vehicle in the running process.

After photographing the real-time image, the camera may directly send the real-time image to a network device, or may send the real-time image to a network device by using the target mobile device. This is not specifically limited herein. In addition, the target mobile device may also have an image obtaining function.

1102. Determine at least one piece of first descriptor information based on the real-time image.

The network device processes the real-time image to obtain the at least one piece of first descriptor information. The first descriptor information includes target natural condition information when the real-time image is photographed. The target natural condition information may be determined by the network device, or may be determined by the mobile device and then sent to the network device. This is not specifically limited herein.

The target natural condition information when the real-time image is photographed is determined based on real-time positioning information of the mobile device. The real-time positioning information of the mobile device may be obtained by using a GPS, a laser radar, and/or a millimeter-wave radar, or may be obtained by using an IMU. This is not specifically limited herein. After the real-time positioning information is obtained, natural condition information of a corresponding location is determined as the target natural condition information.

1103. Compare preset descriptor information in a database with the at least one piece of first descriptor information to determine same descriptor information.

Images of a same scenario under different angles of view, weather, and illumination conditions are different. For example, pixels around a corner point of a sign board on the road on a sunny day are remarkably different from pixels around the corner point on an overcast day. For another example, pixels around a front corner point of the sign board are also remarkably different from pixels around a rear corner point of the sign board. In this way, descriptors of a corner point of a sign board in a same location vary greatly with different weather, different illumination, and different angles of view. Therefore, it may be understood that the real-time image photographed under a natural condition corresponding to the target natural condition information has a unique natural condition. Therefore, one piece of scenario key point information in the real-time image includes only one type of descriptor information. However, one real-time image has a plurality of scenario key points. Therefore, there is at least one piece of descriptor information including the target natural condition information in the real-time image. In a possible case, there are N pieces of first descriptor information in the real-time image, and M pieces of first descriptor information in the N pieces of first descriptor information include the target natural condition information. Both N and M are positive integers, and M is less than or equal to N.

Each of the at least one piece of first descriptor information is compared with the preset descriptor information in the database, to determine the same descriptor information. For example, the real-time image includes a descriptor 1, a descriptor 2, . . . , and a descriptor N, which are separately compared with descriptors in the database. It is found that the database includes descriptors that are the same as the descriptor 1, a descriptor 5, . . . , a descriptor N−1, and the descriptor N.

A manner of determining whether a descriptor is the same as a descriptor in the database is similar to a manner of determining whether descriptors are the same during database construction, in other words, the determining is performed based on a distance between descriptors. Details are not described herein again.

In this embodiment, the preset descriptor information in the database is obtained after the database is constructed according to the steps 501 to 505 in the foregoing embodiment. Details are not described herein again.

1104. Position the real-time image by using the same descriptor information.

First, a same descriptor is determined, a scenario key point to which the same descriptor belongs is searched for in the database, and 3D coordinates of the scenario key point are found. Then, the 3D coordinates of the scenario key point are used for positioning.

For example, in FIG. 12A, the real-time image is compared with the database, and it is found that corresponding descriptors can be found in the database for the descriptor 1 and a descriptor 4. Therefore, it is determined that a scenario key point 1 to which the descriptor 1 belongs and a scenario key point 1 to which the descriptor 1 in the database belongs are a same scenario key point, and a scenario key point 4 to which the descriptor 4 belongs and a scenario key point 4 to which the descriptor 4 in the database belongs are a same scenario key point. 3D coordinates of the same scenario key points are found 3D coordinates 1 and 3D coordinates 2. Then, positioning calculation is performed by using the 3D coordinates 1 and the 3D coordinates 2.

The network device performs positioning calculation by using same scenario key point information. After the same scenario key point in the database is determined, a pose of the mobile device is obtained based on a preset algorithm. In this embodiment, a calculation formula of positioning is:

$$r(T_V^G) = \sum_{i=1}^{n} \|\pi_C (T_D^G)^{-1} T_V^G (\pi_C)^{-1} p_i^C - p_i^D\|^2.$$

In the foregoing formula, $T_V^G$ is the to-be-solved pose of the mobile device, is pixel coordinates of a scenario key point in the real-time image, and the pixel coordinates are pixel coordinates relative to the real-time image, $p_i^D$ is pixel coordinates of a scenario key point that matches in a map database, and the pixel coordinates are pixel coordinates relative to the database. i ranges from 1 to n, indicating that there are a total of n scenario key points in the real-time image that match scenario key points in the database. $\pi_C$ is an intrinsic parameter matrix of the camera, and can be used to convert 3D coordinates into pixel coordinates. 3D coordinates relative to the vehicle are obtained by performing $(\pi_C)^{-1}$ conversion on and then 3D coordinates relative to a world coordinate system are obtained by performing $T_V^G$ conversion on the obtained 3D coordinates relative to the vehicle. Then, pixel coordinates relative to the database are obtained by performing $\pi_C(T_D^G)^{-1}$ conversion on the obtained 3D coordinates relative to the world coordinate system. $T_D^G$ is a pose of a key frame to which the scenario key point $p_i^D$ in the database belongs relative to the world coordinate system. The pixel coordinates obtained through conversion are consistent with pixel coordinates $p_i^D$ of a matched scenario key point in the database, and the pixel coordinates are subtracted to obtain a reprojection error model. Finally, a real-time pose $T_V^G$ of the vehicle can be obtained by minimizing a value of the reprojection error model by using an optimization method.

The mobile device performs positioning based on a calculation result. After obtaining a positioning result through calculation, the network device returns the positioning result to the mobile device, to facilitate the mobile device in performing a positioning operation.

It should be noted that the positioning calculation may alternatively be performed by the mobile device. After determining the same scenario key point in the database, the network device sends information about the same scenario key point to the mobile device, and the mobile device obtains pose information based on the preset algorithm and performs the positioning operation.

In this embodiment, the information that is about the same scenario key point and that is sent by the network device to the mobile device specifically includes pixel coordinates of the scenario key point, and a pose of a key frame to which the scenario key point belongs, and may further include 3D coordinates of the scenario key point. This is not specifically limited herein.

In this embodiment, a specific process in which the constructed database is used for positioning is described. After the database is constructed according to FIG. 5, because the database includes more descriptor information of different natural conditions, when the database is used for positioning, more same descriptor information in the database can be matched for the real-time image. This makes positioning more accurate.

It should be noted that, in the positioning process, the database may further be updated based on different descriptor information, making information stored in the database more complete.

After the at least one piece of first descriptor information is determined based on the real-time image, the preset descriptor information in the database is further compared with the at least one piece of first descriptor information to determine different descriptor information, and the database is constructed based on the different descriptor information. Specifically, the constructing the database based on the different descriptor information includes the following two cases.

1. Second scenario key point information to which the different descriptor information belongs does not exist in the database.

The network device determines whether a second scenario key point exists in the database of the network device. The determining manner is similar to a manner of determining whether scenario key points are the same during database construction, in other words, the determining is performed based on 3D coordinates. Details are not described herein again. If the second scenario key point does not exist in the database, apparently, the second scenario key point information does not exist in the database either.

Referring to FIG. 12A, for example, compared with the real-time image, the database does not include a scenario key point 4, and further does not include a descriptor 10 of the scenario key point 4. The descriptor 10 is a different descriptor in this embodiment. In this case, the second scenario key point information including the different descriptor, namely, information about the scenario key point 4, is added to the database.

2. Second scenario key point information to which the different descriptor belongs exists in the database, but the second scenario key point information in the database does not include target descriptor information.

When it is determined that the second scenario key point information exists in the database, in this case, the second scenario key point information does not include the determined different descriptor information. Refer to FIG. 12B. For example, the database includes a scenario key point 1, a scenario key point 2, and a scenario key point 3 that are the same as those in the real-time image, but information about the scenario key point 3 in the database does not include a target descriptor, namely, a descriptor 9, of the scenario key point 3 in the real-time image. In this case, descriptor information corresponding to the different descriptor 9 is added to the database.

It should be noted that, if a second scenario key point to which a target descriptor belongs needs to be added to the database, 3D coordinates of the second scenario key point need to be synchronously updated to the database. Because real-time image information includes only descriptor information and pixel coordinate information, and does not include 3D coordinates, in this case, descriptors in the database that are the same as those in the real-time image are first used for positioning, and then 3D coordinates of different scenario key points are added to the database. A manner of determining the 3D coordinates of the different scenario key points is as follows. After the same descriptor is used to perform positioning to obtain the positioning result of the real-time image, the 3D coordinates of the different scenario key points are determined by using a binocular camera, or may be determined by using both a monocular camera and the IMU. The manner of determining the 3D coordinates of the different scenario key points is not specifically limited herein.

In this embodiment, the database is updated and improved based on the different descriptor information in a real-time positioning process. In this way, the database can be better used for positioning.

Figure 13:
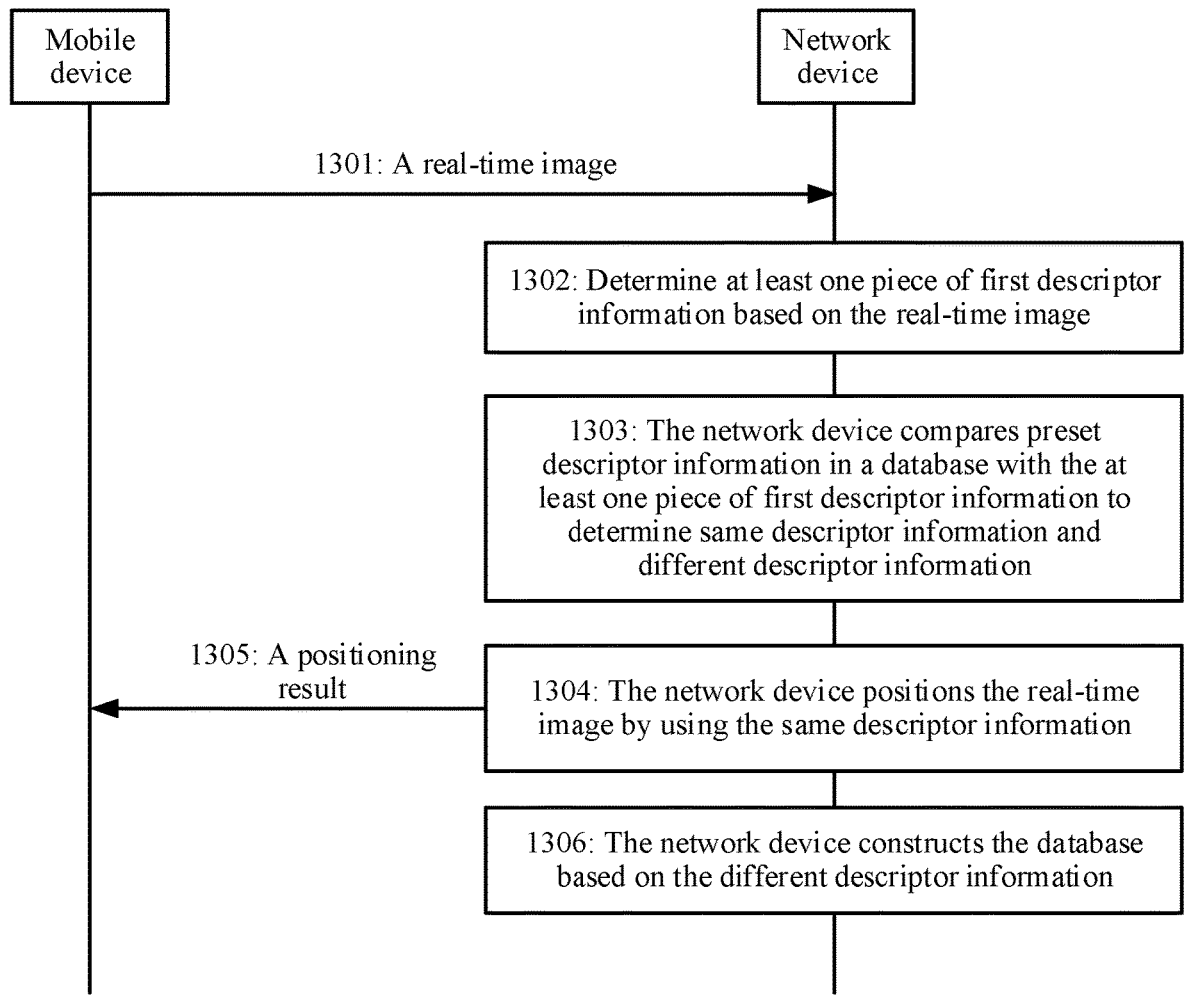
FIG. 13 is a schematic diagram of another embodiment of a positioning method according to this application.

In this embodiment, the real-time positioning process is a process in which the mobile device exchanges data with the network device. Referring to FIG. 13, the following provides description.

1301. A mobile device sends a real-time image to a network device.

In addition to the real-time image, the mobile device may further send, to the network device, location information of the mobile device or a natural condition of a location of the mobile device when the real-time image is photographed.

1302. The network device determines at least one piece of first descriptor information based on the real-time image.

1303. The network device compares preset descriptor information in a database with the at least one piece of first descriptor information to determine same descriptor information and different descriptor information.

1304. The network device positions the real-time image by using the same descriptor information.

1305. Send a positioning result to the mobile device.

The mobile device performs a positioning operation based on the positioning calculation result determined by the network device. In this embodiment, the positioning calculation operation may alternatively be performed by the network device. This is not specifically limited herein.

1306. The network device constructs the database based on the different descriptor information.

In this embodiment, the steps 1301 to 1306 in this embodiment are similar to the steps in the embodiment shown in FIG. 11. Details are not described herein again.

The foregoing describes the embodiments of this application from perspectives of the positioning method and the database construction method. The following describes a structure of a network device in the embodiments of this application.

Figure 14:
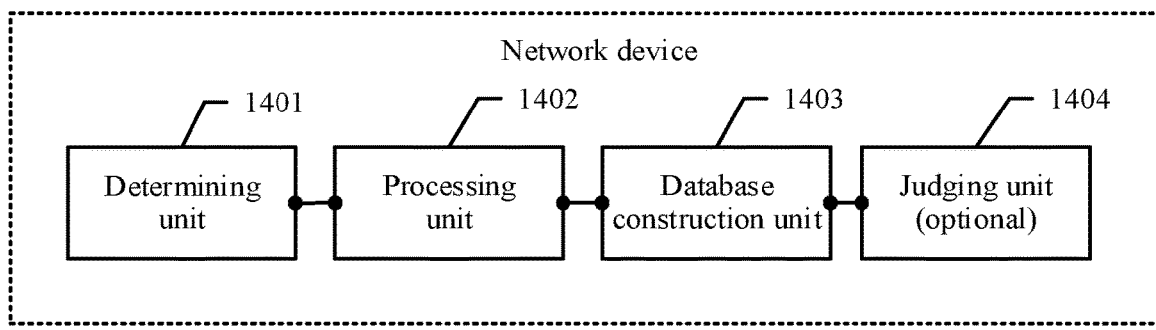
FIG. 14 is a schematic structural diagram of a network device according to this application.

Based on the foregoing database construction method, a possible structure of the network device is shown in FIG. 14. The network device includes a determining unit 1401, a processing unit 1402, and a database construction unit 1403.

The determining unit 1401 is configured to determine a target image set that meets a preset image coincidence degree requirement, where the target image set includes at least one image, and each image corresponds to one type of natural condition information.

The processing unit 1402 is configured to obtain a scenario key point information set based on the target image set and the natural condition information corresponding to each image, where the scenario key point set includes at least one piece of scenario key point information.

The determining unit 1401 is further configured to determine, in the scenario key point information set, first scenario key point information corresponding to a scenario key point whose life value on a single mobile device is greater than a first preset life value threshold, where the life value is used to represent a probability that the scenario key point is a static scenario key point.

The determining unit 1401 is further configured to determine, in the first scenario key point information, second scenario key point information corresponding to a scenario key point whose life value on a plurality of mobile devices is greater than a second preset life value threshold.

The database construction unit 1403 is configured to, when the second scenario key point information does not match preset scenario key point information in a database, construct the database based on the second scenario key point information.

Optionally, that the second scenario key point information does not match preset scenario key point information in a database includes the second scenario key point information does not exist in the database, and the database construction unit 1403 is specifically configured to add the second scenario key point information to the database, where the second scenario key point information includes target descriptor information about target natural condition information.

Optionally, that the second scenario key point information does not match preset scenario key point information in a database includes the second scenario key point information exists in the database, and the second scenario key point information does not include target descriptor information about target natural condition information, and the database construction unit 1403 is specifically configured to add the target descriptor information to the preset second scenario key point information in the database.

Optionally, the determining unit 1401 is further configured to determine 3D coordinates of the second scenario key point corresponding to the second scenario key point information, and when a difference between 3D coordinates of each preset scenario key point in the database and the 3D coordinates of the second scenario key point is greater than a first preset threshold, determine that the second scenario key point information does not exist in the database, or when a difference between 3D coordinates of any one preset scenario key point in the database and the 3D coordinates of the second scenario key point is less than a first preset threshold, determine that the second scenario key point information exists in the database.

Optionally, the determining unit 1401 is further configured to determine at least one piece of descriptor information of the preset second scenario key point in the database.

The network device further includes a judging unit 1404, configured to determine whether the at least one piece of descriptor information includes one piece of descriptor information, where a distance between a descriptor corresponding to the one piece of descriptor information and a descriptor corresponding to the target descriptor information is less than a preset distance threshold.

The determining unit 1401 is further configured to, if the at least one piece of descriptor information does not include the one piece of descriptor information, where the distance between the descriptor corresponding to the one piece of descriptor information and the descriptor corresponding to the target descriptor information is less than the preset distance threshold, determine that the preset second scenario key point information in the database does not include the target descriptor information.

Optionally, in a fifth implementation of the fourth aspect, the life value of the scenario key point on the single mobile device is f, and a calculation formula of f is $$f = \frac{1}{\sigma\sqrt{2n}} e^{-\frac{1}{2}\left(\frac{n-n_0}{\sigma}\right)^2},$$

where n indicates a quantity of times that the scenario key point is observed on the single mobile device, $n_0$ is a preset average value of a quantity of times that a scenario key point is observed, and $\sigma$ is a preset variance of the quantity of times that the scenario key point is observed.

Optionally, the life value of the scenario key point on the plurality of mobile devices is F, and a calculation formula of F is $$F = \sum_{i=1}^{n} \beta_i f_i,$$

where f is the life value of the scenario key point on the single mobile device, B is a weight coefficient corresponding to each mobile device, and one of the plurality of mobile devices corresponds to one weight coefficient.

Optionally, a calculation formula of $\beta_i$ is $=\gamma_t \gamma_g + \gamma_c$, where $\gamma_t$ is a time continuity index of the scenario key point observed on the plurality of mobile devices, $\gamma_g$ is a geometric continuity index of the scenario key point observed on the plurality of mobile devices, and $\gamma_c$ is a description consistency index of the scenario key point observed on the plurality of mobile devices.

Optionally, the determining unit 1401 is specifically configured to select an image based on a preset distance spacing, and when a difference between a coincidence degree of selected images and a preset coincidence degree threshold is within a preset precision range, determine that the selected images belong to the target image set.

Optionally, the preset distance spacing is $d_{k+1}$.

A calculation formula of the preset distance spacing is $d_{k+1} = d_k + d_k(\alpha^* - \alpha)$, where $\alpha^*$ is the preset coincidence degree threshold, $d_k$ is a distance spacing for image selection at a previous moment, and a is a coincidence degree of images when the images are selected based on the distance spacing $d_k$.

Optionally, the determining unit 1401 is specifically configured to select an image based on a preset angle spacing, and when a difference between a coincidence degree of selected images and a preset coincidence degree threshold is within a preset precision range, determine that the selected images belong to the target image set.

Optionally, the preset angle spacing is $\theta_{k+1}$.

A calculation formula of the preset angle spacing is $\theta_{k+1} = \theta_k \ \theta_k(\alpha^* - a)$, where $\alpha^*$ is the preset coincidence degree threshold, $\theta_k$ is an angle spacing for image selection at a previous moment, and $\alpha$ is a coincidence degree of images when the images are selected based on the angle spacing $\theta_k$.

Optionally, the scenario key point information includes descriptor information corresponding to the natural condition information. The processing unit 1402 is specifically configured to (1) process one target image to obtain a scenario key point, (2) constitute the scenario key point information by using the scenario key point, the target image to which the scenario key point belongs, and the natural condition information corresponding to the target image, and perform the steps (1) and (2) again until the scenario key point information set is constituted.

Optionally, the determining unit 1401 is further configured to determine third scenario key point information in the constructed database.

The database construction unit 1403 is further configured to, when a FNCS of a third scenario key point corresponding to the third scenario key point information is less than a preset FNCS threshold, delete the third scenario key point information from the database.

Optionally, a calculation formula of the FNCS is $$FNCS = \frac{m_i}{M}\log\frac{N}{n_i}, \text{ where } \frac{m_i}{M}$$

is a probability that the scenario key point is used during positioning, and $$\frac{N}{n_i}$$

is a percentage or a quantity of descriptors of the scenario key point in a total quantity of descriptors in an image to which the scenario key point belongs.

Figure 15:
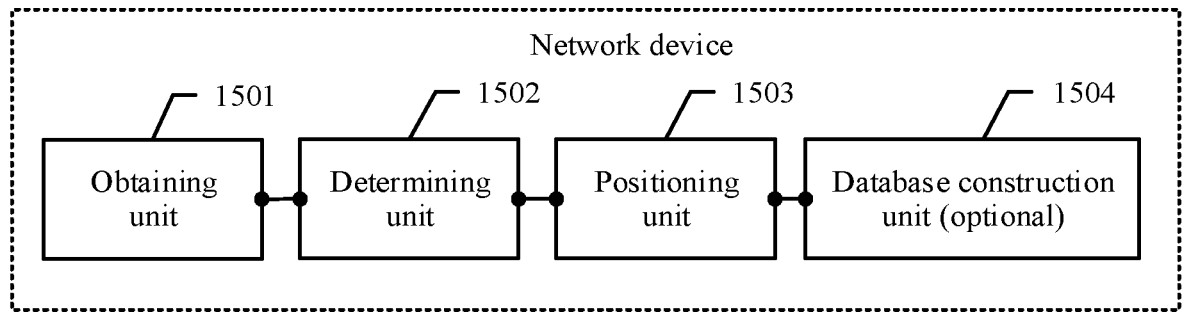
FIG. 15 is another schematic structural diagram of a network device according to this application.

Based on the foregoing positioning method, another possible structure of the network device is shown in FIG. 15. The network device includes an obtaining unit 1501, a determining unit 1502, and a positioning unit 1503.

The obtaining unit 1501 is configured to obtain a real-time image.

The determining unit 1502 is configured to determine at least one piece of first descriptor information based on the real-time image, where the first descriptor information includes target natural condition information when the real-time image is photographed.

The determining unit 1502 is further configured to compare preset descriptor information in a database with the at least one piece of first descriptor information to determine same descriptor information, where the preset descriptor information in the database is obtained by the network device by determining a target image set that meets a preset image coincidence degree requirement, obtaining a scenario key point information set based on the target image set and natural condition information corresponding to each image in the target image set, selecting, from the scenario key point information set, first scenario key point information corresponding to a first scenario key point that meets a preset life value requirement, and then constructing the database based on second descriptor information that is in the first scenario key point information and that corresponds to the target natural condition information, the second descriptor information does not match the preset descriptor information in the database, and the scenario key point information includes descriptor information corresponding to the natural condition information.

The positioning unit 1503 is configured to position the real-time image by using the same descriptor information.

Optionally, the positioning unit 1503 is specifically configured to determine first scenario key point information corresponding to the same descriptor information in the database, and obtain, through calculation based on the first scenario key point information and a positioning calculation formula, a location of a target mobile device when the real-time image is photographed.

Optionally, the positioning calculation formula of the location of the target mobile device when the real-time image is photographed is:

$$r(T_V^G) = \sum_{i=1}^{n} \|\pi_C(T_D^G)^{-1} T_V^G (\pi_C)^{-1} p_i^C - p_i^D\|^2,$$

where $p_i^C$ is pixel coordinates of the first scenario key point in the real-time image, $\pi_C$ is an intrinsic parameter matrix of a camera, $\pi_C$ is used to convert 3D coordinates into pixel coordinates, $T_D^G$ is a pose of an image to which a scenario key point $p_i^D$ in the database belongs relative to a world coordinate system, $p_i^D$ is pixel coordinates of the first scenario key point in the database, a value of i ranges from 1 to n, n is a positive integer, and the first scenario key point corresponds to the first scenario key point information.

Optionally, the determining unit 1502 is further configured to compare the preset descriptor information in the database with the at least one piece of first descriptor information to determine different descriptor information.

The network device further includes a database construction unit 1504.

The database construction unit 1504 is specifically configured to construct the database based on the different descriptor information.

Optionally, when second scenario key point information to which the different descriptor information belongs does not exist in the database, the database construction unit 1504 is specifically configured to add the second scenario key point information including the different descriptor information to the database.

Optionally, when second scenario key point information to which the different descriptor information belongs exists in the database, the database construction unit 1504 is specifically configured to add the different descriptor information to the second scenario key point information in the database.

Optionally, the determining unit 1502 is further configured to determine 3D coordinates of the second scenario key point corresponding to the second scenario key point information, and when a difference between 3D coordinates of each preset scenario key point in the database and the 3D coordinates of the second scenario key point is greater than a first preset threshold, determine that the second scenario key point information does not exist in the database, or when a difference between 3D coordinates of any one preset scenario key point in the database and the 3D coordinates of the second scenario key point is less than a first preset threshold, determine that the second scenario key point information exists in the database.

It should be noted that content such as information exchange between the modules/units of the foregoing apparatus and the execution processes thereof is based on the same idea as that of the method embodiments of this application, and produces the same technical effects as those of the method embodiments of this application. For the specific content, refer to the foregoing description in the method embodiments of this application. Details are not described herein again.

An embodiment of this application further provides a computer storage medium. The computer storage medium stores a program. The program is executed to perform some or all of the steps recorded in the foregoing method embodiments.

Figure 16:
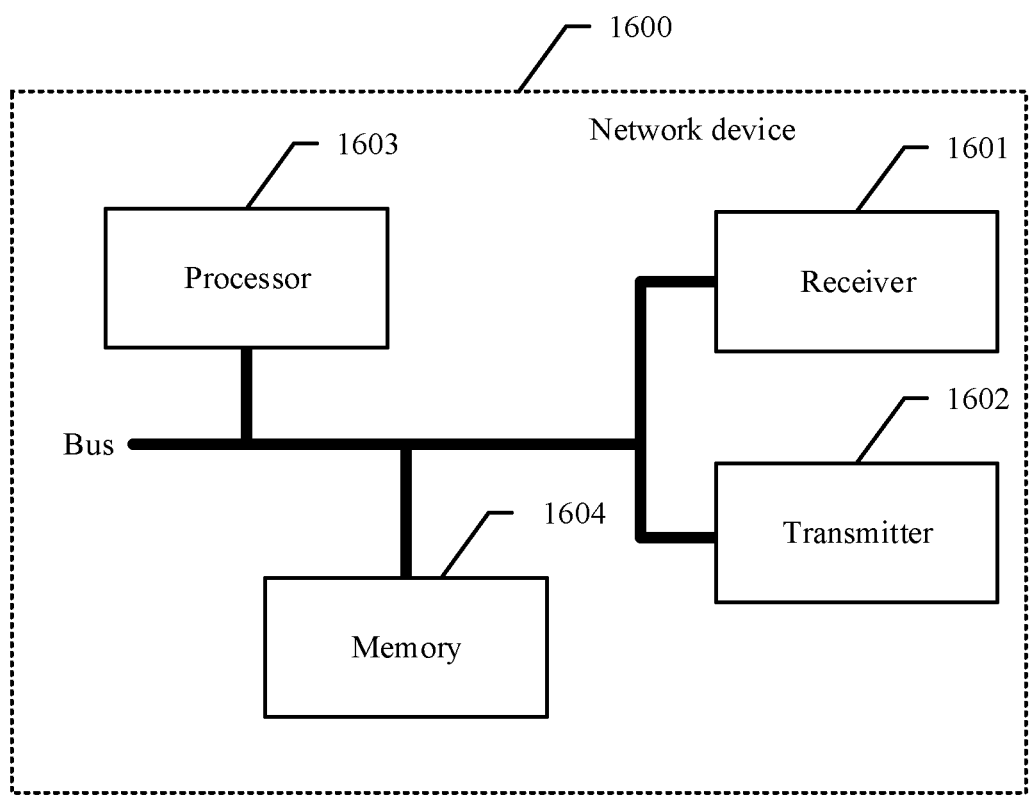
FIG. 16 is another schematic structural diagram of a network device according to this application.

The following describes another network device provided in an embodiment of this application. Referring to FIG. 16, a network device 1600 includes a receiver 1601, a transmitter 1602, a processor 1603, and a memory 1604 (there may be one or more processors 1603 in the network device 1600, and an example in which there is one processor is used in FIG. 16). In some embodiments of this application, the receiver 1601, the transmitter 1602, the processor 1603, and the memory 1604 may be connected by using a bus or in another manner, and a connection by using the bus is used as example in FIG. 16.

The memory 1604 may include a read-only memory (ROM) and a random-access memory (RAM), and provide an instruction and data for the processor 1603. A part of the memory 1604 may further include a non-volatile random access memory (NVRAM). The memory 1604 stores an operating system and an operation instruction, an executable module or a data structure, a subset thereof, or an extended set thereof. The operation instruction may include various operation instructions for performing various operations. The operating system may include various system programs, for implementing various basic services and processing hardware-based tasks.

The processor 1603 controls operations of the network device, and the processor 1603 may also be referred to as a central processing unit (CPU). In a specific application, various components of the network device are coupled together by using a bus system. In addition to a data bus, the bus system includes a power bus, a control bus, a status signal bus, and the like. However, for clear description, various types of buses in the figure are marked as the bus system.

The methods disclosed in the foregoing embodiments of this application may be applied to the processor 1603 or may be implemented by the processor 1603. The processor 1603 may be an integrated circuit chip and has a signal processing capability. In an implementation process, the steps in the foregoing methods can be implemented by using a hardware integrated logic circuit in the processor 1603, or by using instructions in a form of software. The processor 1603 may be a general-purpose processor, a digital signal processor (DSP), an application-specific integrated circuit (ASIC), a field-programmable gate array (FPGA) or another programmable logic device, a discrete gate or transistor logic device, or a discrete hardware component. The processor may implement or perform the methods, the steps, and logical block diagrams that are disclosed in the embodiments of this application. The general-purpose processor may be a microprocessor, or the processor may be any conventional processor or the like. The steps of the methods disclosed with reference to the embodiments of this application may be directly executed and accomplished by using a hardware decoding processor, or may be executed and accomplished by using a combination of hardware and software modules in the decoding processor. A software module may be located in a mature storage medium in the art, such as a RAM, a flash memory, a ROM, a programmable read-only memory (PROM), an electrically erasable programmable read-only memory (EEPROM), or a register. The storage medium is located in the memory 1604, and the processor 1603 reads information in the memory 1604 and completes the steps in the foregoing methods in combination with hardware of the processor.

The receiver 1601 may be configured to receive input digital or character information, and generate a signal input related to a related setting and function control of the network device. The transmitter 1602 may include a display device such as a display screen, and the transmitter 1602 may be configured to output digital or character information by using an external interface.

In this embodiment of this application, the processor 1603 is configured to perform the foregoing database construction method and positioning method.

In addition, it should be noted that the described apparatus embodiments are merely examples. The units described as separate parts may or may not be physically separate, and parts displayed as units may or may not be physical units, may be located in one position, or may be distributed on a plurality of network units. Some or all the modules may be selected based on actual needs to achieve the objectives of the solutions of the embodiments. In addition, in the accompanying drawings of the apparatus embodiments provided in this application, connection relationships between modules indicate that the modules have communication connections to each other, which may specifically be implemented as one or more communications buses or signal cables.

Based on the description of the foregoing implementations, a person skilled in the art may clearly understand that this application may be implemented by software in addition to necessary universal hardware, or by dedicated hardware, including an application specific integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for this application, software program implementation is a better implementation in most cases. Based on such an understanding, the technical solutions of this application essentially or the part contributing to other approaches may be implemented in a form of a software product. The computer software product is stored in a readable storage medium, such as a floppy disk, a Universal Serial Bus (USB) flash drive, a removable hard disk, a ROM), a RAM), a magnetic disk, or an optical disc of a computer, and includes several instructions for instructing a computer device (which may be a personal computer, a server, a network device, or the like) to perform the methods described in the embodiments of this application.

All or some of the foregoing embodiments may be implemented by using software, hardware, firmware, or any combination thereof. When software is used to implement the embodiments, the embodiments may be implemented fully or partially in a form of a computer program product.

The computer program product includes one or more computer program instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

What is claimed is:

1. A database construction method, comprising:
   determining a target image set that meets a preset image coincidence degree requirement, wherein the target image set comprises at least one image, and wherein each of the at least one image corresponds to a type of natural condition information;
   obtaining a scenario key point information set based on the target image set and the natural condition information;
   determining, in the scenario key point information set, first scenario key point information corresponding to a first scenario key point whose first life value on a single mobile device is greater than a first preset life value threshold, wherein the first life value represents a probability that the first scenario key point is a static scenario key point;
   determining, in the first scenario key point information, second scenario key point information corresponding to a second scenario key point whose second life value on a plurality of mobile devices is greater than a second preset life value threshold; and
   constructing the database based on the second scenario key point information when the second scenario key point information does not match preset scenario key point information in a database.

2. The database construction method of claim 1, wherein the second scenario key point information does not match the preset scenario key point information when the second scenario key point information does not exist in the database, wherein the database construction method further comprises adding the second scenario key point information to the database, and wherein the second scenario key point information comprises target descriptor information about target natural condition information.

3. The database construction method of claim 1, wherein the second scenario key point information does not match the preset scenario key point information when the second scenario key point information exists in the database and when the second scenario key point information does not comprise target descriptor information about target natural condition information, wherein the database construction method further comprises adding the target descriptor information to the preset second scenario key point information in the database.

4. The database construction method of claim 2, wherein before adding the second scenario key point information to the database, the database construction method further comprises:
   determining three-dimensional (3D) coordinates of the second scenario key point; and
   determining that the second scenario key point information does not exist in the database when a difference between 3D coordinates of each preset scenario key point in the database and the 3D coordinates of the second scenario key point is greater than a first preset threshold or determining that the second scenario key point information exists in the database when a difference between 3D coordinates of any one preset scenario key point in the database and the 3D coordinates of the second scenario key point is less than the first preset threshold.

5. The database construction method of claim 3, wherein before adding the target descriptor information to the preset second scenario key point information, the database construction method further comprises:
   determining at least one piece of descriptor information of a preset second scenario key point in the database, wherein a distance between a first descriptor corresponding to the at least one piece of descriptor information and a second descriptor corresponding to the target descriptor information is less than a preset distance threshold; and determining that the preset second scenario key point information in the database does not comprise the target descriptor information when the at least one piece of descriptor information is not determined.

6. The database construction method of claim 1, further comprising:

selecting an image based on a preset distance spacing; and determining that the image belongs to the target image set when a difference between a coincidence degree of the image and a preset coincidence degree threshold is within a preset precision range, wherein the preset distance spacing is $d_{k+1}$, wherein the preset distance spacing is based on the following equation:

$$d_{k+1}=d_k+d_k(\alpha^*-\alpha),$$

wherein $\alpha^*$ is the preset coincidence degree threshold, wherein $d_k$ is a distance spacing for image selection at a previous moment, and wherein $\alpha$ is a coincidence degree of the image when the image is selected based on the distance spacing $d_k$.

7. The database construction method of claim 1, further comprising:

selecting an image based on a preset angle spacing; and determining that the image belongs to the target image set when a difference between a coincidence degree of the image and a preset coincidence degree threshold is within a preset precision range, wherein the preset angle spacing is $\theta_{k+1}$, wherein the preset angle spacing is based on the following equation:

$$\theta_{k+1}=\theta_k+\theta_k(\alpha^*-\alpha),$$

wherein $\alpha^*$ is the preset coincidence degree threshold, wherein $\theta_k$ is an angle spacing for image selection at a previous moment, and wherein $\alpha$ is a coincidence degree of the image when the image is selected based on the angle spacing $\theta_k$.

8. The database construction method of claim 1, wherein the scenario key point information comprises descriptor information corresponding to the natural condition information, and wherein the database construction method further comprises:

processing a target image to obtain a scenario key point;

constituting the scenario key point information using the scenario key point, the target image, and natural condition information corresponding to the target image; and repeating the processing and the constituting until the scenario key point information set is constituted.

9. The database construction method of claim 1, wherein after constructing the database, the database construction method further comprises:

determining third scenario key point information in the constructed database; and deleting the third scenario key point information from the database when a feature number controlling score (FNCS) of a third scenario key point corresponding to the third scenario key point information is less than a preset FNCS threshold, wherein the FNCS is based on the following equation:

$$FNCS = \frac{m_i}{M}\log\frac{N'}{n_i} \text{ wherein } \frac{m_i}{M}$$

is a probability that the third scenario key point is used during positioning, and wherein $$\frac{N}{n_i}$$

is a percentage of a quantity of descriptors of the third scenario key point in a total quantity of descriptors in an image to which the third scenario key point belongs.

10. A network device, comprising:

a processor; and a memory coupled to the processor and configured to store instructions that, when executed by the processor, cause the network device to be configured to:

determine a target image set that meets a preset image coincidence degree requirement, wherein the target image set comprises at least one image, and wherein each of the at least one image corresponds to a type of natural condition information;

obtain a scenario key point information set based on the target image set and the natural condition information;

determine, in the scenario key point information set, first scenario key point information corresponding to a first scenario key point whose first life value on a single mobile device is greater than a first preset life value threshold, wherein the first life value represents a probability that the first scenario key point is a static scenario key point;

determine, in the first scenario key point information, second scenario key point information corresponding to a second scenario key point whose second life value on a plurality of mobile devices is greater than a second preset life value threshold; and construct a database based on the second scenario key point information when the second scenario key point information does not match preset scenario key point information in the database.

11. The network device of claim 10, wherein the second scenario key point information does not match the preset scenario key point information when the second scenario key point information does not exist in the database, wherein the instructions further cause the processor to be configured to add the second scenario key point information to the database, and wherein the second scenario key point information comprises target descriptor information about target natural condition information.

12. The network device of claim 10, wherein the second scenario key point information does not match the preset scenario key point information when the second scenario key point information exists in the database, and the second scenario key point information does not comprise target descriptor information about target natural condition information, wherein the instructions further cause the processor to be configured to add the target descriptor information to the preset second scenario key point information in the database.

13. The network device of claim 11, wherein the instructions further cause the processor to be configured to:

determine three dimensional (3D) coordinates of the second scenario key point; and determine that the second scenario key point information does not exist in the database when a difference between 3D coordinates of each preset scenario key point in the database and the 3D coordinates of the second scenario key point is greater than a first preset threshold, or determine that the second scenario key point information exists in the database when a difference between 3D coordinates of any one preset scenario key point in the database and the 3D coordinates of the second scenario key point is less than the first preset threshold.

14. The network device of claim 12, wherein the instructions further cause the processor to be configured to:
   determine at least one piece of descriptor information of a preset second scenario key point in the database, wherein a distance between a first descriptor corresponding to the at least one piece of descriptor information and a second descriptor corresponding to the target descriptor information is less than a preset distance threshold; and
   determine that the preset second scenario key point information in the database does not comprise the target descriptor information when the network device does not determine the at least one piece of descriptor information.

15. The network device of claim 10, wherein the instructions further cause the processor to be configured to:
   select an image based on a preset distance spacing; and
   determine that the image belongs to the target image set when a difference between a coincidence degree of the image and a preset coincidence degree threshold is within a preset precision range, wherein the preset distance spacing is $d_{k+1}$, wherein the preset distance spacing is based on the following equation:

$$d_{k+1}=d_k+d_k(\alpha^*-\alpha),$$

wherein $\alpha^*$ is the preset coincidence degree threshold, wherein $d_k$ is a distance spacing for image selection at a previous moment, and wherein $\alpha$ is a coincidence degree of the image when the image is selected based on the distance spacing $d_k$.

16. The network device of claim 10, wherein the instructions further cause the processor to be configured to:
   select an image based on a preset angle spacing; and
   determine that the image belongs to the target image set when a difference between a coincidence degree of the image and a preset coincidence degree threshold is within a preset precision range, wherein the preset angle spacing is $\theta_{k+1}$, wherein the preset angle spacing is based on the following equation:

$$\theta_{k+1}=\theta_k+\theta_k(\alpha^*-\alpha),$$

wherein $\alpha^*$ is the preset coincidence degree threshold, wherein $\theta_k$ is an angle spacing for image selection at a previous moment, and wherein $\alpha$ is a coincidence degree of the image when the image is selected based on the angle spacing $\theta_k$.

17. The network device of claim 10, wherein the scenario key point information comprises descriptor information corresponding to the natural condition information, and wherein the instructions further cause the processor to be configured to:
   process a target image to obtain a scenario key point;
   constitute the scenario key point information using the scenario key point, the target image, and natural condition information corresponding to the target image; and
   repeat processing and the constituting until the scenario key point information set is constituted.

* * * * *

UNITED STATES PATENT AND TRADEMARK OFFICE
CERTIFICATE OF CORRECTION

PATENT NO. : 11,644,339 B2
APPLICATION NO. : 17/126908
DATED : May 9, 2023
INVENTOR(S) : Xun Chai et al.

It is certified that error appears in the above-identified patent and that said Letters Patent is hereby corrected as shown below:

In the Claims

Claim 9, Column 47, Line 65: "log N'/ni wherein" should read "log N/ni, wherein"

Signed and Sealed this
Fourth Day of July, 2023

Katherine Kelly Vidal
*Director of the United States Patent and Trademark Office*